United States Patent [19]

Gourlay et al.

[11] Patent Number: 4,645,897
[45] Date of Patent: Feb. 24, 1987

[54] METHOD AND APPARATUS FOR ALIGNING TWO WORK PIECES FOR WELDING AND FOR WELD UPSET REMOVAL

[75] Inventors: Robert R. R. Gourlay; Neill M. Sherriffs, both of Inverness, Scotland

[73] Assignee: A.I. Welders Limited, Scotland

[21] Appl. No.: 589,426

[22] Filed: Mar. 14, 1984

[30] Foreign Application Priority Data

Mar. 14, 1983 [GB] United Kingdom ............... 8306958
Dec. 21, 1983 [GB] United Kingdom ............... 8333992

[51] Int. Cl.⁴ .......................................... B23K 11/02
[52] U.S. Cl. ................................... 219/101; 219/53; 219/55; 219/104
[58] Field of Search ............... 219/53, 55, 57, 58, 219/100, 101, 104, 97, 161; 228/213, 49 A, 49 R; 409/298–300

[56] References Cited

U.S. PATENT DOCUMENTS

| | | | |
|---|---|---|---|
| 2,212,393 | 8/1940 | Dalton | 219/101 |
| 2,787,698 | 4/1957 | Schlatter et al. | 219/101 |
| 3,030,494 | 4/1962 | Baer et al. | 219/101 |
| 3,081,673 | 3/1963 | Ansel | 219/101 |
| 3,134,012 | 5/1964 | Neukom et al. | 219/101 |
| 3,595,463 | 7/1971 | Fadeev et al. | 219/101 X |
| 3,925,636 | 12/1975 | Coleman | 219/104 |
| 3,978,746 | 9/1976 | Kuchuk-Yatsenko et al. | 409/298 |
| 4,175,897 | 11/1979 | Kuchuk-Yatsenko et al. | 409/300 |
| 4,410,780 | 10/1983 | Mutti | 219/101 X |

FOREIGN PATENT DOCUMENTS

| | | | |
|---|---|---|---|
| 1067697 | 5/1967 | United Kingdom. | |
| 335055 | 5/1972 | U.S.S.R. | 219/124.02 |
| 959948 | 9/1982 | U.S.S.R. | 219/101 |

Primary Examiner—E. A. Goldberg
Assistant Examiner—C. M. Sigda
Attorney, Agent, or Firm—Jones, Tullar & Cooper

[57] ABSTRACT

A rail alignment device and a shear head are suspended from a trolley running over a rail welding machine. The alignment device comprises structure forming a downwardly-opening bight and carrying locating stops, clamping cylinders and transducers with sensing plungers all of which project into the bight. The rail ends to be butt-welded are received within the bight for alignment. One of the rails is clamped against the stops by the cylinders. The location of the other rail relative to the structure is sensed by the transducers and the machine clamps are adjusted until those transducers indicate alignment of the rails. The device is then removed and stored remote from the gap, with the shear head, during welding. The shear head comprises a horseshoe-shaped back plate which carries three cutting tools. An arm, which is pivotally mounted on one of the ends of the back plate and adapted to be latched to the other end to close the bight of the back plate, carries a fourth cutting tool. After welding, the shear head is lowered into the gap until its upper tool abuts the top of the welded rail between the weld and the movable head. The arm is raised and latched automatically to complete a continuous frame of cutting tools around the rail. The shear head is then driven across the weld by the movable head to remove weld upset.

34 Claims, 20 Drawing Figures

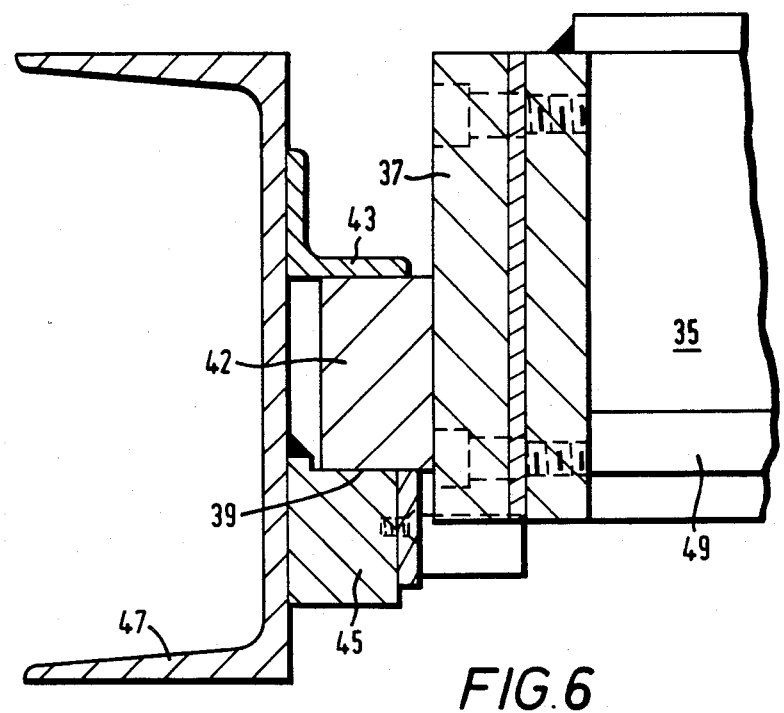
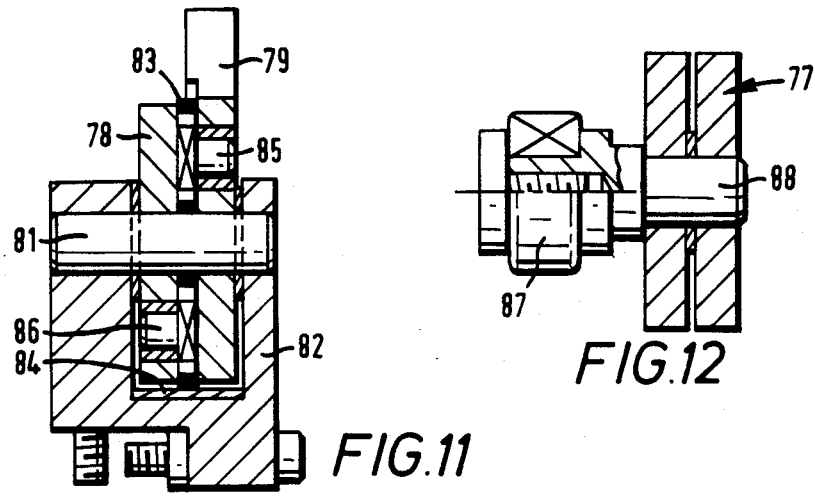

METHOD AND APPARATUS FOR ALIGNING TWO WORK PIECES FOR WELDING AND FOR WELD UPSET REMOVAL

TECHNICAL FIELD

This invention relates to butt-welding two work pieces in bar form, such as railway track, end to end in a butt-welding machine and is concerned with a method and apparatus for aligning the two work pieces for butt-welding and with removal of weld upset from the resultant butt-welded material.

PRIOR ART

UK Nos. A-1479531; A-1479532 and A-1479533 disclose a butt-welding machine incorporating an arrangement for automatically aligning two rails which are to be welded together end to end in a butt-welding machine. The disclosed alignment device comprises sensors mounted on an arm which is normally positioned to one side of a gap in which the weld is formed, the arm being swung about its pivot mounting into that gap to position the sensors adjacent the ends of the two rails. The proximity of those rail ends to the arm is sensed by the sensors and any displacement of either or both of those rails from a predetermined respective location relative to the arm is corrected automatically by adjustment means in the respective clamping mechanism by which the or each displaced rail is clamped in the machine, the adjustment means being activated by a feedback signal from the respective sensor until the sensed displacement has been eliminated and the rails are aligned. The arm is then swung back to its normal location where it remains whilst the rails are welded together.

Such an alignment device requires that the clamps for both rails be provided with adjustment means and therefore is not suitable for use in all kinds of rail welding machine because some commercially available rail welding machines are only provided with adjustment means for one of the clamps. Secondly the disclosed alignment device can only be used to align the adjacent side of the rail and the top of the rail. It cannot be used to align whichever side of the rail happens to be the running surface as is often required in practice.

A considerable amount of upset metal is formed at each weld around the profile of the rail during welding of continuously welded railway track by butt welding. Such upset metal needs to be removed. Conventionally it is removed by shearing. A minimal amount of raised portion is left after shearing but it may be removed subsequently by grinding to a precise profile where required, for example at the head or running surface of the rail.

The butt-welding process generates a large amount of weld spatter which adheres to anything in the enclosure (known as the fire box) that surrounds the weld location.

Normal practice is for upset to be removed by shearing in a special machine separate from the butt-welding machine after the welded track has been transferred from the butt-welding machine to the shearing machine. Obviously operation of such a separate shearing machine is not influenced by weld spatter generated during the butt-welding process.

There have been various proposals for removing weld upset from welded track before that track is removed from the butt-welding machine. U.S. Pat. No. 2,787,698 discloses upset removal by moving the weld passed fixed shearing blades as the welded track is removed from the butt-welding machine. This was found to be unsatisfactory. U.S. Pat. Nos. 3,030,494; 3,081,673; 3,134,012; UK Nos. A-1067697; A-1479532 and A-1479533 disclose a butt-welding machine provided with movable shear cutters which are stored spaced from the welding location whilst the weld is formed and which are advanced generally in the longitudinal direction of the rail to a location adjacent the weld from where they are driven across the weld to remove the upset. Many of these proposals are mechanically complex and they are suitable for use only in conjunction with special butt-welding machines which have been designed to accommodate such a mechanism. They suffer either from the disadvantage that the adjacent main clamps have to be released to allow the movable shear cutters to be advanced towards the weld, the clamps being releasable without risk to the quality of the welded joint only after the weld has cooled sufficiently for the weld to be rigid, or from the disadvantage that the shear cutters are stored during the welding operation at a location in the butt-welding machine where they are exposed to weld spatter. The latter disadvantage is also suffered by the arrangement disclosed in U.S. Pat. No. 3,595,463, where shearing blades which embrace the rail are fixed to the movable head of the machine, and by the arrangements disclosed in U.S. Pat. Nos. 3,978,746 and 4,175,897 and in EP No. A-0038242 which disclose such cutters which are mounted on the machine near the weld location and are pivotable into position to embrace the rail for upset removal.

An object of this invention is to provide an alignment device suitable for aligning rails or other such work pieces for butt-welding, the device being capable of being used in all kinds of welding machines and which can be used to align lengths of rail regardless of whichever side of the rail set up in a butt-welding machine happens to be the running surface of the rail.

Another object of this invention is to provide apparatus for the removal of weld upset from butt-welded material in bar form and of uniform cross section, such as continuously welded railway track, which is mechanically simple in construction and mode of operation, which may be used with various forms of conventional butt-welding machines rather than being suitable only for use with special machines specially designed to accommodate the upset removal apparatus, which can be positioned outside the firebox during welding and which does not interfere with support of the rail so that the time period between formation of the weld and removal of the weld upset is governed only by the time required to transfer the cutting tools from their location during welding to the weld shearing location.

BRIEF DESCRIPTION OF THE INVENTION

Alignment of two lengths of rail clamped in respective heads of a butt-welding machine for welding together end to end is checked and any adjustments necessary to achieve the required degree of alignment is made before welding. The alignment is checked by alignment means which are inserted automatically by mechanical handling equipment into the gap between the heads of the machine and which are clamped to one of the rail lengths. Proximity sensing means carried by the alignment means sense the relative location of the other rail. Any displacement of that other rail from the optimum position for alignment is removed by automatic operation of adjustment means in one of the heads which repositions the respective rail length to shift it to the optimum position at which the rail lengths are aligned. The alignment means are then removed from the gap to a remote location and welding takes place.

Weld upset is removed from the welded rail before it is removed from the machine by a group of linked shear cutting tools which are inserted, after the weld is formed, into the gap between the heads of the machine in a direction which is transverse to the welded rail. The group of tools is assembled around the welded rail automatically to form a continuous frame around the rail between the weld and a movable head of the machine, the cutting edge of each tool being located adjacent a correspondingly contoured surface portion of the rail. The movable head is then moved towards the weld and urges the continuous frame across the weld upset which is sheared from the welded rail by the cutting tools.

Assembly of the group of linked cutting tools into a continuous frame that surrounds the butt-welded material provides each tool with greater structural support than is provided for each tool of the previously proposed arrangements that disclose cutters mounted on the machine near the weld location and pivotable into position to embrace a rail for upset removal.

The group of linked cutting tools is inserted into the gap automatically by mechanical handling equipment which presents one of the tools to the welded rail to initiate and effect automatic assembly of the tools around the rail into the continuous frame. The mechanical handling equipment also disassembles the tools from around the rail after weld upset has been removed and transfers the tools from within the gap to a location remote therefrom where the tools are shielded from weld spatter during welding.

That this is achievable automatically in practice is surprising having regard to the confined space available between the two heads of the welding machine, the relative bulkiness of the group of tools, and the distance through which the group of tools has to be moved from outside the gap to the welded rail for assembly around the rail and from which assembly of that group of tools around the rail has to be actuated and controlled from a remote location.

In the preferred embodiment, the mechanical handling equipment which inserts the alignment means into the gap and the mechanical handling equipment which inserts the group of cutting tools into the gap are incorporated in a single mechanical handling equipment arrangement.

BRIEF DESCRIPTION OF THE DRAWINGS

Apparatus in which this invention is embodied is described now by way of example with reference to the accompanying drawings, of which:

FIG. 6 is a section on the line VI—VI in FIG. 5;

FIG. 11 is a fragmentary sectioned view on the line XI—XI in FIG. 8;

FIG. 12 is a fragmentary sectioned view on the line XII—XII in FIG. 8;

FIG. 15 is a partly-sectioned plan of FIG. 13, the section being taken on the line XV—XV in FIG. 13, and alternative locations of certain parts being shown chain-dotted;

FIGS. 1 to 3 show a flash butt welding machine 10. The machine 10 comprises a base 11, a static head 12 and a movable head 13. The static head 12 is mounted upon the base 11 for vertical adjustment relative to the base 11 by vertically-acting hydraulic cylincers 14 and associated power driven wedge arrangements 15 and for horizontal adjustment relative to the base 11 by similar means (not shown), but normally is stationary relative to the base 11. The movable head 13 is supported on the base 11 at 16 for rectilinear sliding movement towards and away from the static head 12, and is driven for such movement by a pair of hydraulic actuators 17.

Figure 2:
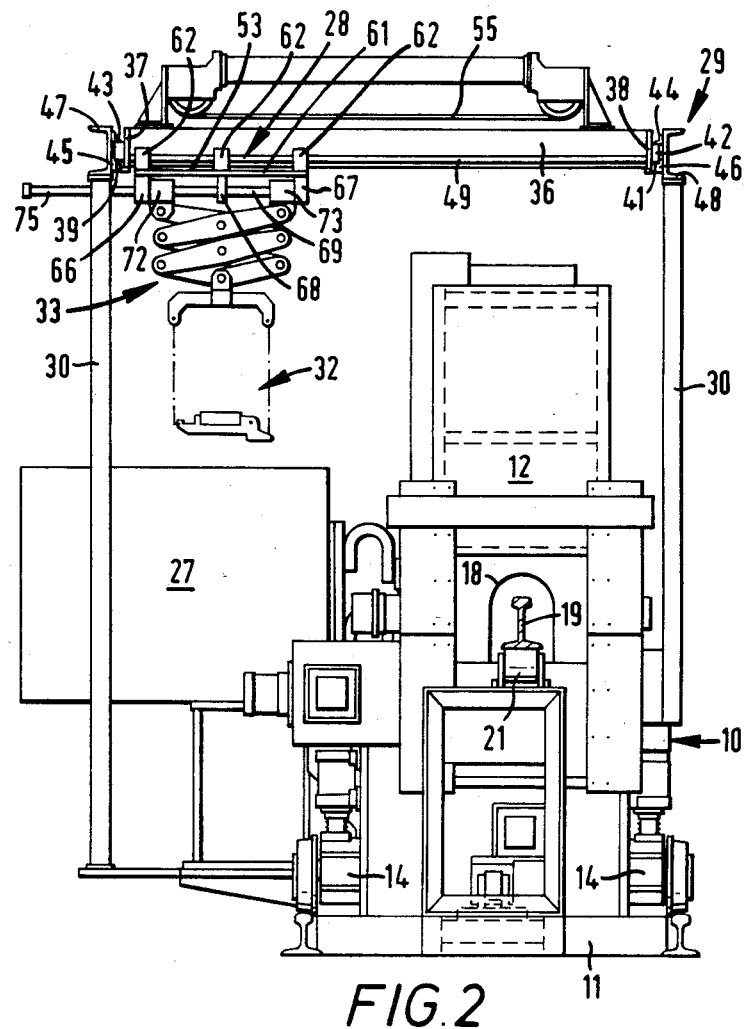
FIG. 2 is an end elevation of FIG. 1 with the alignment unit, its support arrangement, overhead carriage and beam omitted.

Each head 12, 13 has a tunnel (see FIG. 2 for the tunnel 18 formed in the static head 12). Supporting means are provided for supporting two work pieces 19 and 20, each comprising a length of rail and extending through a respective one of the tunnels. The supporting means comprise support rollers 21 and 22 which are resiliently supported upon the base 11 at locations which are separated by the two heads 12 and 13, and support pads 23 and 24 which are mounted in each head 12, 13 adjacent the end of the respective tunnel that is nearer the other head 12, 13 and hence adjacent the gap or confined space between the two heads 12 and 13. Each head 12, 13 has a vertically acting clamping unit, generally indicated at 25 and 26 respectively, at the edge of the gap between the two heads 12 and 13. Each clamping unit 25, 26 comprises a lower die 25A, 26A upon which the respective work piece 19, 20 normally rests, and an upper die 25B, 26B which is shown spaced from the respective work piece 19, 20 and which is operable in cooperation with the respective lower die 25A, 26A to apply a clamping force whereby the respective work piece 19, 20 is held within the respective head 12, 13 for welding. The dies 25A, 25B, 26A and 26B serve also as current carrying electrodes by which each work piece 19, 20 is connected in the electrical circuit which includes a welding transformer 27, the dies being formed of copper alloy.

The work pieces 19 and 20 are welded together end to end by operation of the butt-welding machine 10 in a conventional manner which briefly comprises the work piece 19 being held stationary in the static head 12 by the respective clamping arrangement 25 while the other work piece 20, which in turn is clamped within the movable head 13 by the respective clamping arrangement 26, is moved towards and away from the butt end of the work piece 19 in order to draw an arc between the work pieces 19 and 20 for the purpose of producing heat and, when the end portions of the work pieces 19 and 20 are sufficiently heated, the parts are suddenly pushed together with a large force which is exerted by the hydraulic cylinders 17, in order to fuse the ends together. The resultant forging action raises an amount of upset metal around the profile of the resultant length of track at the welded joint. A large amount of weld spatter which adheres to anything within the region of the gap between the two heads 12 and 13 is generated during the welding process.

Alignment of the work pieces 19 and 20 is checked and any adjustment necessary to achieve the required degree of alignment is made before the work pieces are welded together. Moreover the upset is removed, leaving a minimum amount of raised portion which will be ground subsequently to an exact profile where required, for example at the head of the resultant rail, after the welding operation is carried out and before the resultant length of track is removed from the machine 10.

A trolley 28 is supported above the heads 12 and 13 by a gantry 29 for movement along a path which is substantially parallel to the work pieces 19 and 20. The gantry 29 is supported from the base 11 by vertical posts 30. A device 31, which forms part of an automatic alignment system which is incorporated in the machine 10, and a shear head 32 are each suspended from the trolley 28 by a respective depending extensible support arrangement 34, 33. Hence they are movable horizontally above the heads 12 and 13 with the trolley 28, and, when the respective part of the trolley 28 from which they depend, is located directly above the weld location within the gap between the heads 12 and 13, they can be lowered to the vicinity of the adjacent ends of the work pieces 19 and 20 by extension of the respective extensible support arrangement 33, 34.

Figure 1:
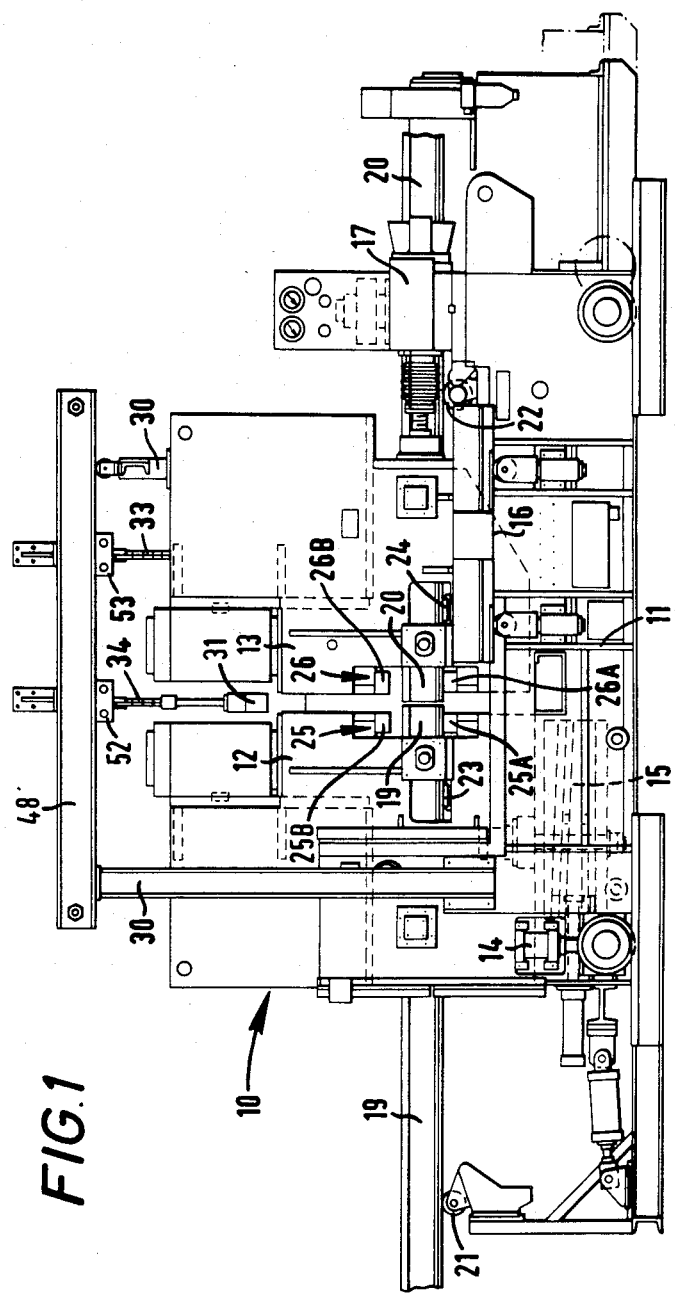
FIG. 1 is a side elevation of a railway track butt-welding machine fitted with apparatus for aligning lengths of railway track that are to be welded together end to end and with apparatus for removing weld upset from welded track in the machine.
Figure 3:
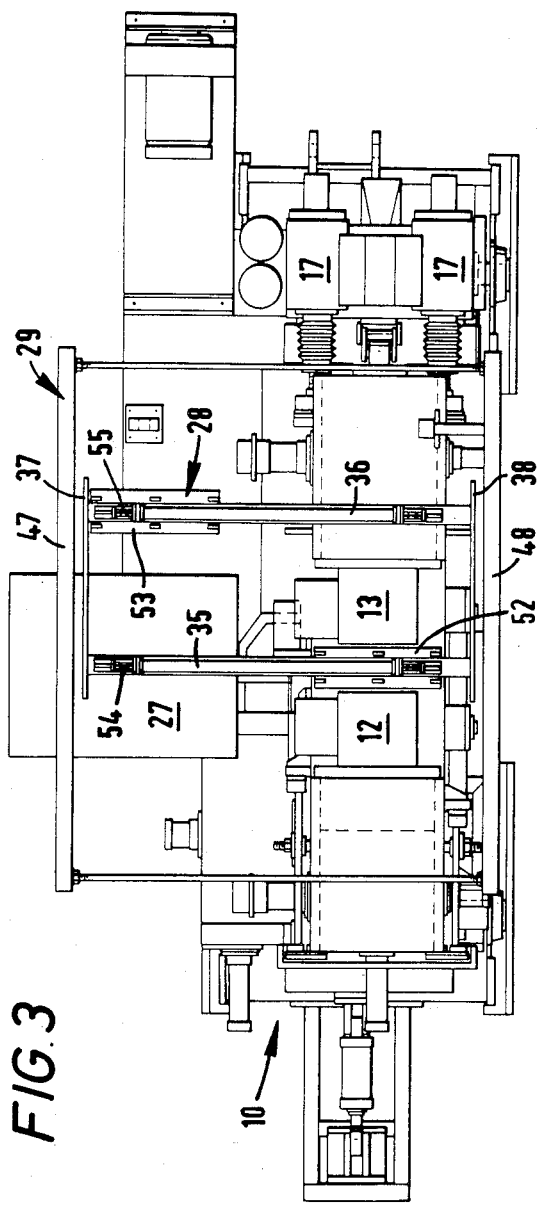
FIG. 3 is a plan of FIG. 1.
Figure 4:
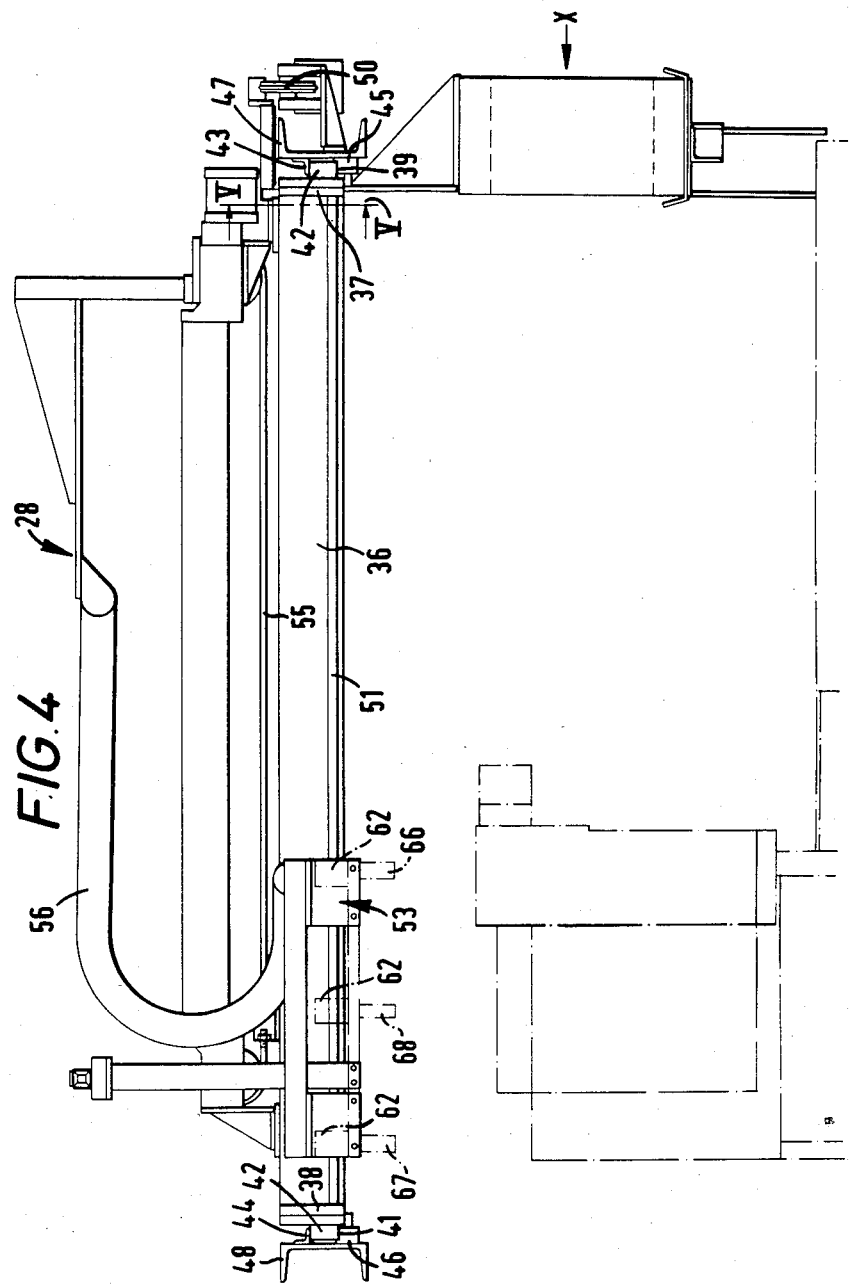
FIG. 4 is an elevation of the overhead transfer trolley as seen in the direction opposite to that from which it is seen in FIG. 2 and drawn to a larger scale than FIG. 2.
Figure 5:
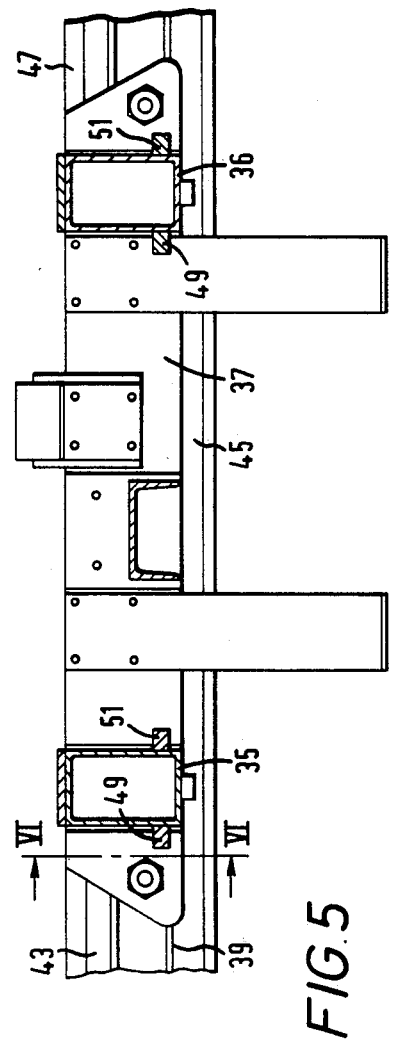
FIG. 5 is a section on the line V—V in FIG. 4.
Figure 7:
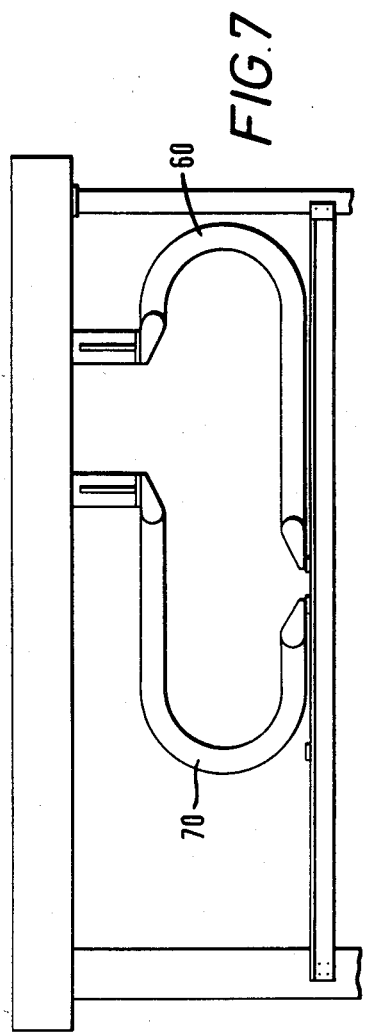
FIG. 7 is a view in the direction of Arrow X in FIG. 4 drawn to a smaller scale than FIG. 4 and with certain parts removed.

The trolley is illustrated in FIGS. 4 to 7 as well as FIGS. 1 to 3. It comprises two parallel beams 35 and 36 which are both connected at either end to a respective one of two end plates 37 and 38. The resultant rectangular structure is supported for sliding movement in the direction that is parallel to the longitudinal axis of the work pieces 19 and 20 by engagement of spigot members 42 in a respective slideway 39, 41 (see FIGS. 2, 4 and 6), each spigot member 42 projecting from a respective one of the end plates 37 and 38. Each guideway 39, 41 is formed between an upper length 43, 44 of angle section and a lower block 45, 46 which are bonded, for example by welding, to the base of a respective one of two channel section beams 47 and 48 which are part of the gantry 29 and which extend generally parallel to the work pieces 19 and 20. The trolley 28 is pulled for movement relative to the gantry 29 in the direction of the work pieces 19 and 20 by an endless belt 50 (see FIG. 4) which is driven in either direction by remote control. Flexible service feeders 60 and 70 (see FIG. 7) respectively connect hydraulic pressure and tank connections (not shown) on the trolley 28, to a source of hydraulic fluid pressure and to an hydraulic fluid reservoir (not shown) in the machine 10, as well as providing other service supplies to the trolley 28, such as electrical and pneumatic supplies.

Each beam 35, 36 has a lateral flange 49, 51 running from end to end along each side and near to the bottom whereby that beam 35, 36 serves as a monorail support for a respective carriage 52, 53. The alignment device 31 is suspended from the carriage 52. The shear head 32 is suspended from the carriage 53. Each carriage 52, 53 is coupled to an endless belt 54, 55 which runs on pulleys mounted on the upper surface of the respective beam 35, 36. Each belt 54, 55 is driven in either direction by remote control so that each carriage 52, 53 is caused to travel along the respective beam 35, 36. A flexible service feeder (e.g. the feeder 56 shown in FIG. 4) follows travel of the respective carriage 52, 53 and serves to convey hydraulic fluid under pressure respectively to and from the respective carriage 52, 53 to the pressure and tank connections on the trolley 28 to which the feeders 60 and 70 are connected, as well as providing other services including electrical and pneumatic supplies to the respective carriage 52, 53.

The construction and operation of each of the carriages 52, 53 and of the respective extensible support arrangement 33, 34 that depends therefrom is similar. For convenience that of the carriage 53 and the respective extensible support arrangement 33 will now be described in detail with reference to FIGS. 8 to 12 although it is to be understood that that description is substantially appropriate for the carriage 52 and the respective extensible support arrangement 34 which will not be described in detail.

The carriage 53 comprises a rectangular base plate 61. Six roller support blocks 62 project upwardly from the upper surface of the base plate 61, one block 62 at each corner of the base plate 61 and one substantially at the centre at each of the longitudinal sides of the base plate 61. A roller 63 is journalled for rotation about a horizontal axis in each block 62, the rollers 63 being positioned inwardly with respect to the blocks 62 and positioned so as to run on the upper surface of the respective flange 49, 51. Two L-shaped roller support blocks 64 are mounted on one of the longer sides of the base plate 61 so as to project upwards therefrom and inwards over the base plate 61 at their upper ends. Each L-shaped block 64 is substantially midway between the central block 62 at that side and the respective block 62 at the corner of that side of the base plate 61. A roller 65 is journalled for rotation about a vertical axis in the inwardly directed flange at the upper end of each L-shaped support block 64 and is located below that flange so as to engage the side surface of the respective longitudinally extending flange 49.

Two end blocks 66 and 67 depend from the base plate 61 at either end and extend over substantially the full width of the base plate 61. A central block 68 depends from the base plate 61 substantially midway between the end blocks 66 and 67. Two rods 69 and 71 are spigotted into corresponding apertures formed in the depending blocks 66, 67 and 68 so that they extend substantially parallel to one another between the end blocks 66 and 67, each substantially directly below the path of the group of three rollers 63 on either side of the base plate 61. A pair of T-shaped bearing blocks 72 and 73 are supported slidably upon the pair of rods 69 and 71 with their stem portions depending below the rods 69 and 71. The bearing block 72 is located between the end block 66 and the central block 68 and the bearing block 73 is located between the central block 68 and the end block 67.

The cylinder bodies of two hydraulic cylinders 74 and 75 are fixed to the bearing block 72 by their ends from which the respective cylinder rod projects. The cylinder rod of each hydraulic cylinder 74, 75 (see the cylinder rod 76 in FIG. 8) is fixed to the other bearing block 73. The depending stem portions of the T-shaped bearing blocks 72 and 73 pass between the cylinder rods of the hydraulic cylinders 74 and 75. The axes of the cylinders 74 and 75 are substantially parallel and are each in substantially the same vertical plane as the axis of a respective one of the rods 69 and 71.

Figure 8:
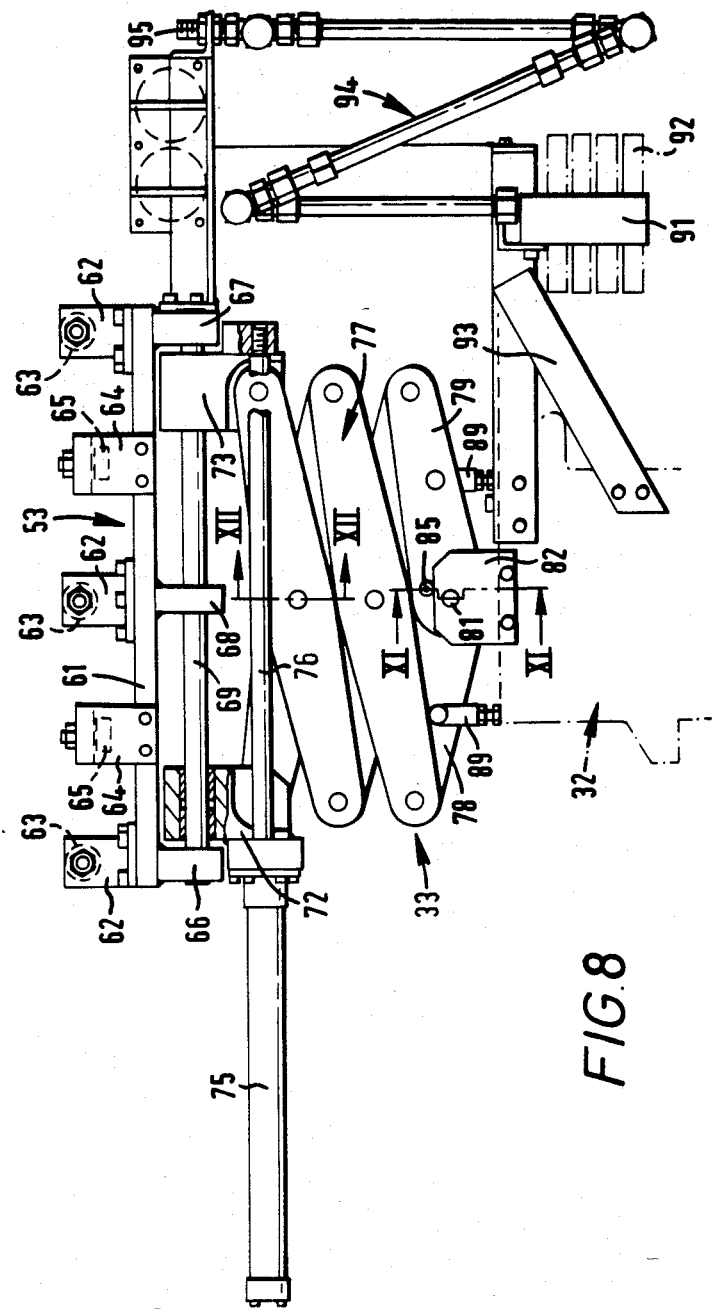
FIG. 8 is an elevation of the extensible support arrangement for the shear head as seen in FIG. 2 but drawn to a larger scale and in greater detail.
Figure 9:
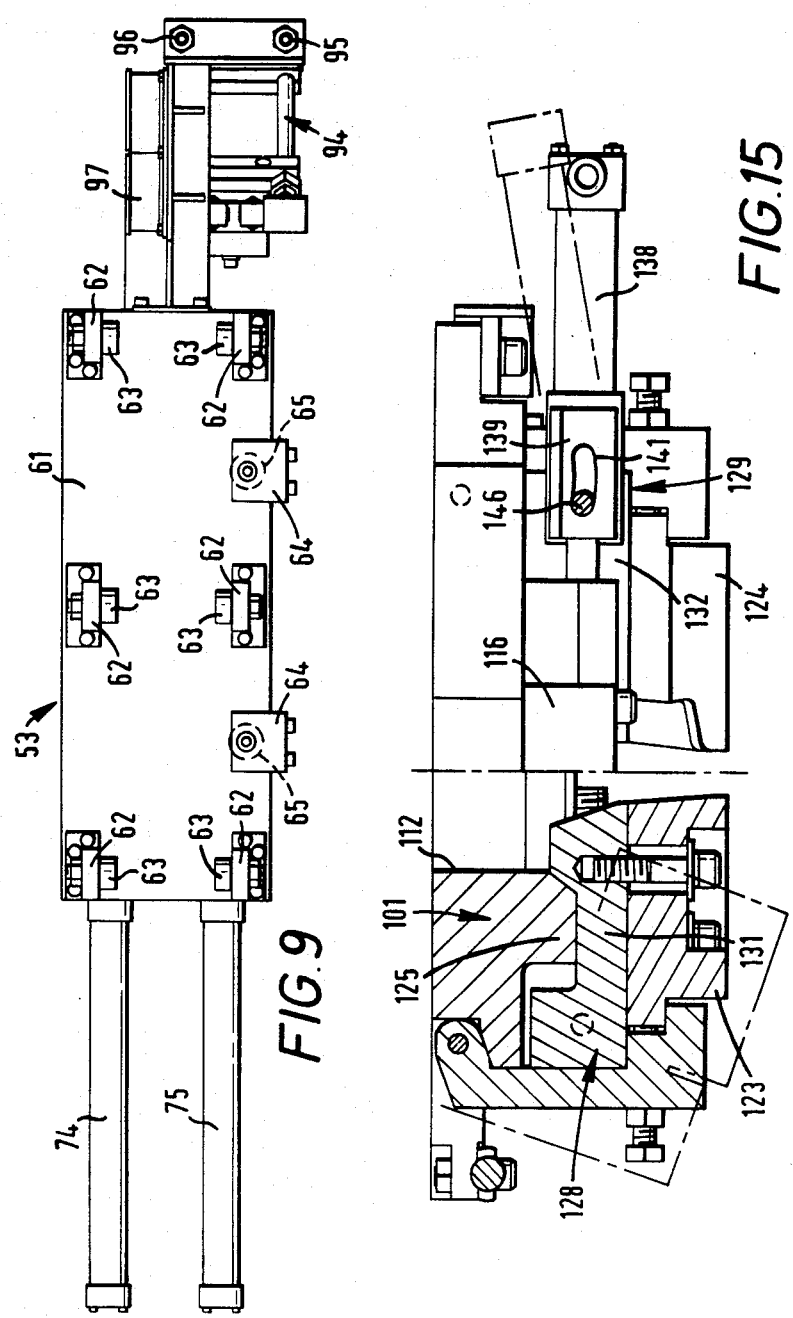
FIG. 9 is a plan of FIG. 8.
Figure 10:
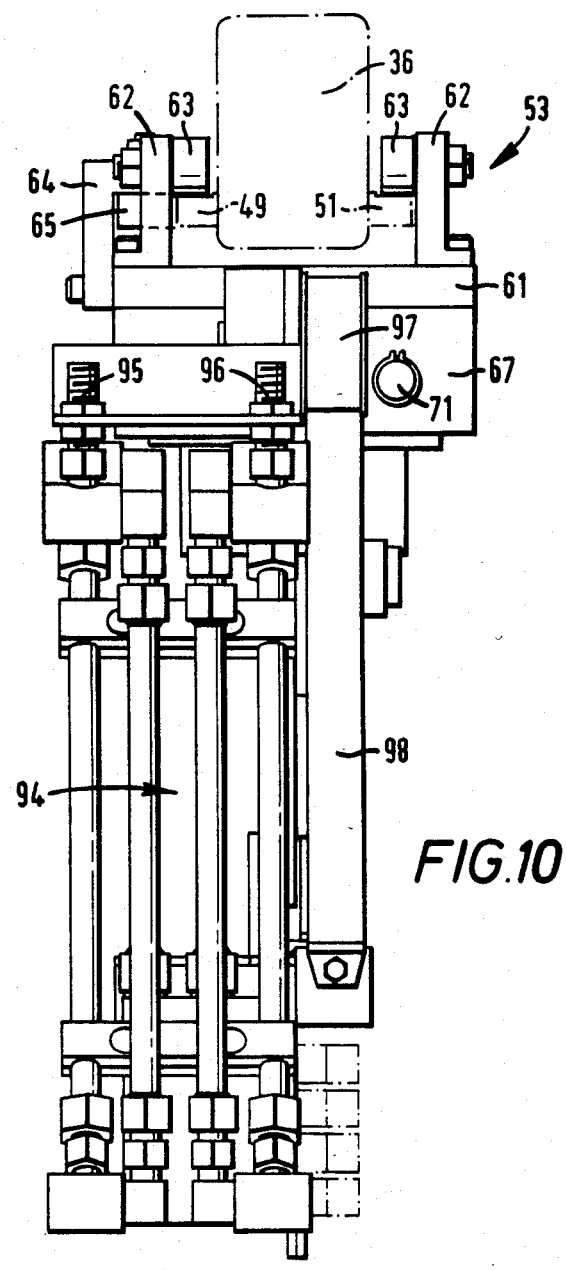
FIG. 10 is an end elevation of FIG. 8.

A triple link lazy tong assembly 77 has two free relatively movable lever ends at one end. Each of those lever ends is pivotally connected to the depending stem portion of a respective one of the T-shaped bearing blocks 72 and 73 so that the assembly 77 depends from the bearing blocks 72 and 73. The pair of links 78 and 79 at the other end of the assembly 77 are hinged together by a common hinge pin 81 which is journalled in the limbs of a generally U-shaped balance block 82 (see FIG. 11) from which the shear head 32 depends. Provisions comprising a balance plate 83 sandwiched between the portions of the links 78 and 79 around the hinge pin 81, a bearing plate 84 which lines the base of the recess of the U-shaped balance block 82 and with which the balance plate 83 cooperates, and pins 85 and 86 which are journalled each in a respective sleeve bearing in a respective aperture in a respective one of the links 78 and 79 and which engage a corresponding bearing pad which is incorporated in the balance plate 83, as shown in FIG. 11, are made for the purposes of stability of the lazy tong assembly 77. Further provisions for that purpose, with particular reference to inhibiting undesired swinging of the assembly 77, are shown in FIG. 12 and comprise a roller 87 which is journalled on the upper hinge pin 88 of the assembly 77 and which cooperates with a fixed vertical guide surface (not shown). Each of the lower links 78 and 79 has a depending stop 89 which engages the upper edge of the shear head 32 when the assembly 77 is contracted as shown in FIG. 8. It will be understood that the lazy tong assembly 77 is contracted when the hydraulic cylinders 74 and 75 are extended and that contraction of those hydraulic cylinders 74 and 75 to withdraw their cylinder rods into their cylinder bodies, in conjunction with the lazy tong assembly 77, causes the bearing blocks 72 and 73 to slide towards one another and the central depending block 68 so as to extend the lazy tong assembly 77 and lower the shear head 32.

A valve manifold 91 and a valve block 92 are supported by a support frame work 93 which is fixed to the shear head 32. The valve manifold 91 is connected by an assembly 94 of articulated feed pipes to pressure and drain connections 95 and 96 which are provided on the base plate 61 and which are connected to the hydraulic fluid supply and hydraulic reservoir of the machine 10 through the flexible hydraulic fluid feeders 56, 60 and 70. A twin spring back to back assembly 97 mounted on the base plate 61 has free ends of its strip spring lengths 98 connected to the support frame work 93 whereby to counterbalance the offset loading of the shear head 32 and fittings mounted thereon.

Figure 13:
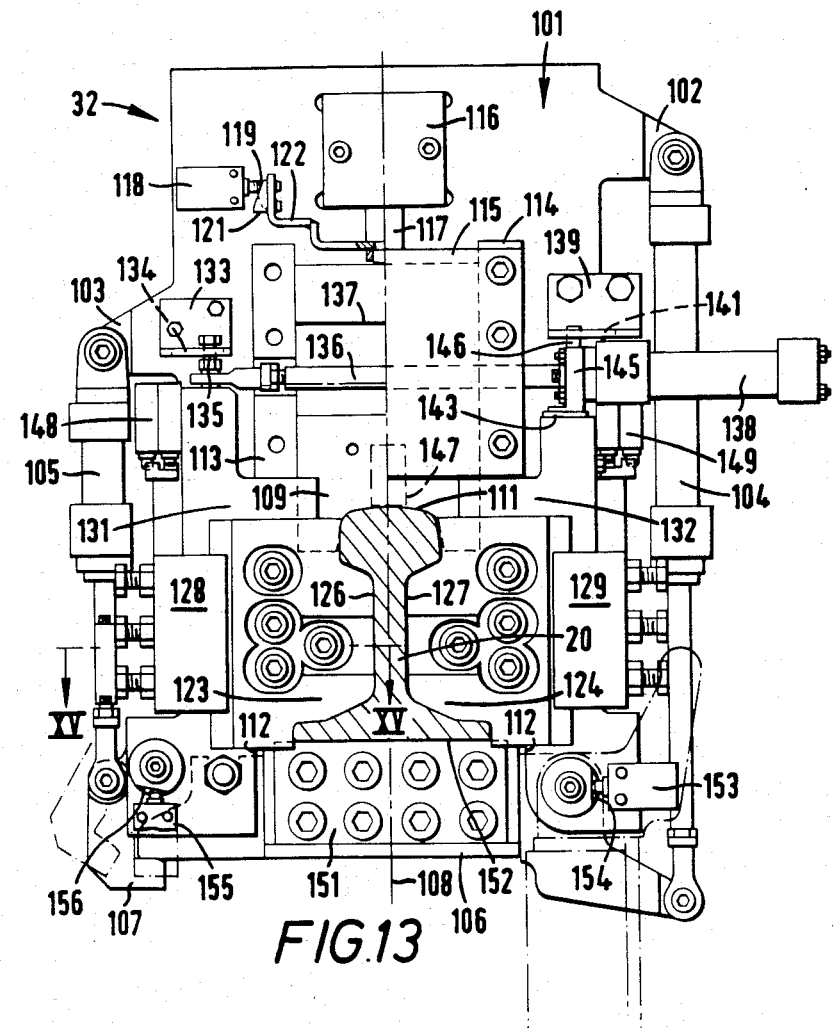
FIG. 13 is a front elevation of the shear head shown in FIG. 2 with half of the cover omitted to reveal hidden detail, and with alternative locations of other parts shown chain-dotted.

FIG. 13 shows that the shear head 32 is basically a capsule which comprises a horseshoe-shaped back plate 101 which is fixed to the balance block 82 of the extensible support mechanism 33 substantially centrally so that its bight 112 opens downwardly. The back plate 101 has a lug 102, 103 projecting from it at either side. The lug 102 is nearer to the balance block 82 than is the lug 103. The cylinder body of a respective one of two hydraulic cylinders 104 and 105 is pivotally connected to a respective one of the lugs 102 and 103. An arm 106 is pivotally mounted at one end of the horseshoe-shaped back plate 101 and is shaped so as to be able to span the gap between the ends of the back plate 101. The cylinder rod of the hydraulic cylinder 104 is pivotally connected to the arm 106 and the hydraulic cylinder 104 is operable by contraction to swing the arm 106 from the position in which it spans the ends of the back plate 101 (as shown in full lines in FIG. 13) to a position, which is indicated by chain-dotted lines in FIG. 13, in which it depends substantially vertically from the end of the back plate 101 at which it is pivotally mounted. A latch 107 is pivotally mounted at the other end of the back plate 101. The cylinder rod of the hydraulic cylinder 105 is pivotally connected to the latch 107. Hence, by contraction or extension of the hydraulic cylinder 105, the latch 107 can be swung between one location in which it engages the arm 106 (as shown in full lines in FIG. 13) to latch the arm 106 in the position in which it spans the gap between the ends of the horseshoe-shaped back plate 101, and another location, which is shown chain-dotted in FIG. 13 and in which it is displaced laterally from the arm 106 so as to release the arm 106 for pivotal movement to and from that position.

The back plate 101 is not symmetrical in the literal sense. The locations of the lugs 102 and 103, the arrangement of the ends for pivotal mounting of the arm 106 and the latch 107, and the configuration of the latter end for cooperation with the free end of the arm 106, destroy the true symmetry, but the back plate 101 is generally symmetrical about an axis 108 of substantial symmetry.

A top tool 109 which has a cutting edge 111 which conforms with the profile of the top of a rail, is supported in face to face contact with the back plate 101 adjacent the centre of the edge of the bight 112. The top tool 109 is constrained for rectilinear sliding movement relative to the back plate 101 by a guide housing comprising a pair of side walls 113 and 114 and a cover 115. The side walls 113 and 114 are fixed to the back plate 101, are parallel to the axis 108 and are disposed symmetrically one on either side of that axis 108. The cover 115 is parallel to the back plate 101 and is fixed to the side walls 113 and 114, bridging the gap between them. The top tool 109 is substantially slidably engaged with the adjacent faces of the sides walls 113 and 114 and the cover 115. Travel of the top tool 109 towards the opening formed by the bight 112 is limited by an abutment (not shown) on the back plate 101.

An hydraulic ram 116 has its body fitted to the back plate 101 on the side of the top tool 109 remote from the bight 112 and is arranged so that the axis of its ram rod 117 is coincident with the axis 108 of the back plate 101. The ram rod 117 projects into the slideway formed by the side walls 113 and 114 and the cover 115 and is engaged with the end wall of the top tool 109 remote from the cutting edge 111. A limit switch 118 cooperates with a pair of ramp followers 119 and 121 which are mounted on an arm 122 which is fitted to the ram rod 117, and thereby serves to indicate the location of the ram rod 117 and thus the location of the top tool 109 relative to the back plate 101.

An opposed pair of side tools 123 and 124 are mounted on the back plate 101 between the top tool 109 and the arm 106, symmetrically about the axis 108. The side tools 123 and 124 project over a major part of the bight 112. The back plate 101 is formed with projections from its face with which the top tool 109 is slidably engaged, those projections being located symmetrically about the axis 108 on either side of the bight 112 and between the top tool 109 and either end of the horseshoe-shaped back plate 101. FIG. 15 shows the projection on one side of the bight 112 at 125.

Figure 14:
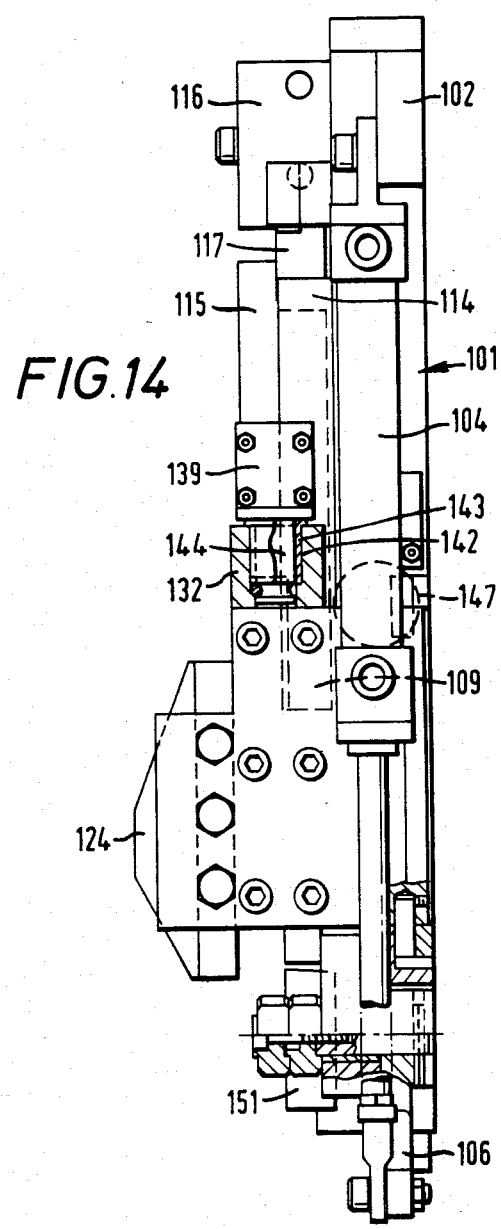
FIG. 14 is a partly-sectioned side elevation of FIG. 13.

Each of the side tools 123 and 124 is formed with a profiled cutting edge 126, 127 which is shaped to conform to the profile of the side of a rail and the web and the side of the base of that rail. Each side tool 123, 124 is mounted on a respective side tool carrier assembly 128, 129. Each carrier assembly 128, 129 is pivoted about the outer edge of the back plate 101, as can be seen most clearly from the sectioned parts of FIGS. 14 and 15. The part 131, 132 of each carrier assembly 128, 129, to which the respective side tool 123, 124 is secured by set screws, has its face remote from the respective side tool 123, 124 recessed so that that part 131, 132 is hook-like in cross-section, as shown in the sectioned part of FIG. 15. Each of the projections of the back plate 101, e.g. the projection 125 with which the side tool carrier assembly part 131 cooperates, is adapted to be received within the recess formed in the adjacent face of the carrier assembly part 131, 132 and is shaped to conform to the profile of that recess so that it reacts forces which are applied to it in two mutually perpendicular directions through the respective carrier assembly part 131, 132. One of the directions in which forces are applied to each projection is substantially normal to the basic plane of the back plate 101. The other of the two mutually perpendicular directions is outwards from within the bight 112. In this context, it can be said that the side tool carrier assemblies 128 and 129 are designed to be hooked onto the back plate 101 when operating to shear metal from a rail.

Since the side tools 123 and 124 are fastened to surfaces of respective side tool carrier assembly parts 131, 132 which engage surfaces on projections from the face of the back plate 101 with which the top tool 109 is in face to face contact, the cutting edges 126 and 127 of the side tools are not in the same vertical plane as the cutting edge 111 of the top tool 109 and are spaced further from the face of the back plate 101 with which the top tool 109 is in contact than is the cutting edge 111 of the top tool.

Each of the side tool carrier assembly parts 131, 132 has a portion which extends alongside the adjacent top tool guide housing side wall 113, 114, outside the top tool guide housing and on the side of that side wall 113, 114 remote from the axis 108. An angle section bracket 133 is secured to the back plate 101 between the top tool guide housing side wall 113 and the adjacent lug 103. An arcuate slot 134 is formed in a portion of the bracket 133 which projects from the back plate 101. The edge of the arcuate slot 134 that is nearer to the back plate 101 is the concave edge. The slot 134 receives a stud 135 which projects from the adjacent portion of the side tool carrier assembly part 131 in a direction which is substantially parallel to the axis 108. The stud 135 is also connected to an end of a cylinder rod 136 which extends from it in a direction transverse to the axis 108, through the side walls 113 and 114 of the top tool guide housing and through a slot 137 in the top tool 109, to the body of an hydraulic cylinder or powered telescopic actuator 138 which is on the other side of the top tool guide housing.

A second angle section bracket 139 is fitted to the back plate 101 on the other side of the top tool guide housing from the side to which the angle section bracket 133 is fitted, and in a similar manner. The angle section bracket 139 is formed with a similar arcuate slot 141. The adjacent portion of the side tool carrier assembly part 132 that extends alongside the top tool guide housing side wall 114, has a blind bore 142 formed in it from its end that is adjacent the angle section bracket 139. A flanged sleeve bearing 143 is spigotted into the blind bore 142. A stub shaft 144 is journalled within the sleeve bearing 143 and has an eccentric post 145 which is secured to the body of the hydraulic cylinder 138 and which is formed at its end as a pin 146 which is received within the arcuate slot 141. It will be appreciated that the side tool carrier assemblies 128 and 129, and hence the side tools 123 and 124 that are mounted thereon are swung away from the back plate 101, as is shown chain-dotted in FIG. 15, for the side tool carrier assembly 131, by extension of the hydraulic cylinder 138, the tools 123 and 124 being swung back into the position in which their carrier assembly parts 131 and 132 are hooked onto the respective projections formed on the back plate 101, by contraction of the hydraulic cylinder 138.

A roller 147 is mounted in the back plate adjacent the edge of the bight 112 for rotation about an axis which is normal to the axis 108. The circumference of the roller 147 is substantially aligned with the cutting edge 111 at the centre of that cutting edge, as considered in a direction normal to the axis 108, when the top tool 109 abuts the ram rod 117.

Limit switch assemblies 148 and 149 mounted on the back plate 101 adjacent the side tool carrier assemblies 128 and 129, each cooperate with a respective follower mounted on the respective side tool carrier assembly 128, 129 so as to respond to swinging movement of the respective side tool carrier assembly 128, 129.

A bottom tool 151 which has a straight cutting edge 152 long enough to remove upset from the whole of the bottom of a rail in one piece, is mounted on the arm 106 with its cutting edge 152 substantially in the same plane as the cutting edge 111. A limit switch 153 cooperates with a flat 154 formed on the arm 106 so that angular movement of the arm 106 is sensed. A limit switch 155 cooperates with a flat 156 formed on the latch 107 so that angular movement of the latch 107 is sensed.

Figure 16:
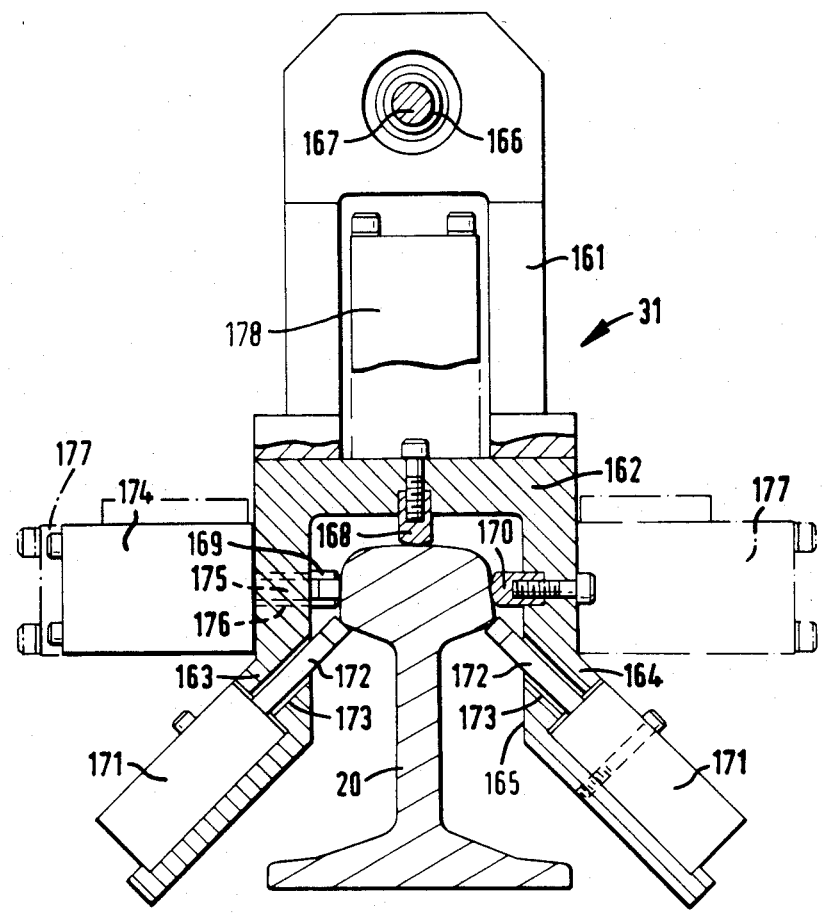
FIG. 16 is a partly-sectioned elevation of the alignment unit shown positioned around a rail for use, the section being on the line XVI—XVI in FIG. 19.
Figure 17:
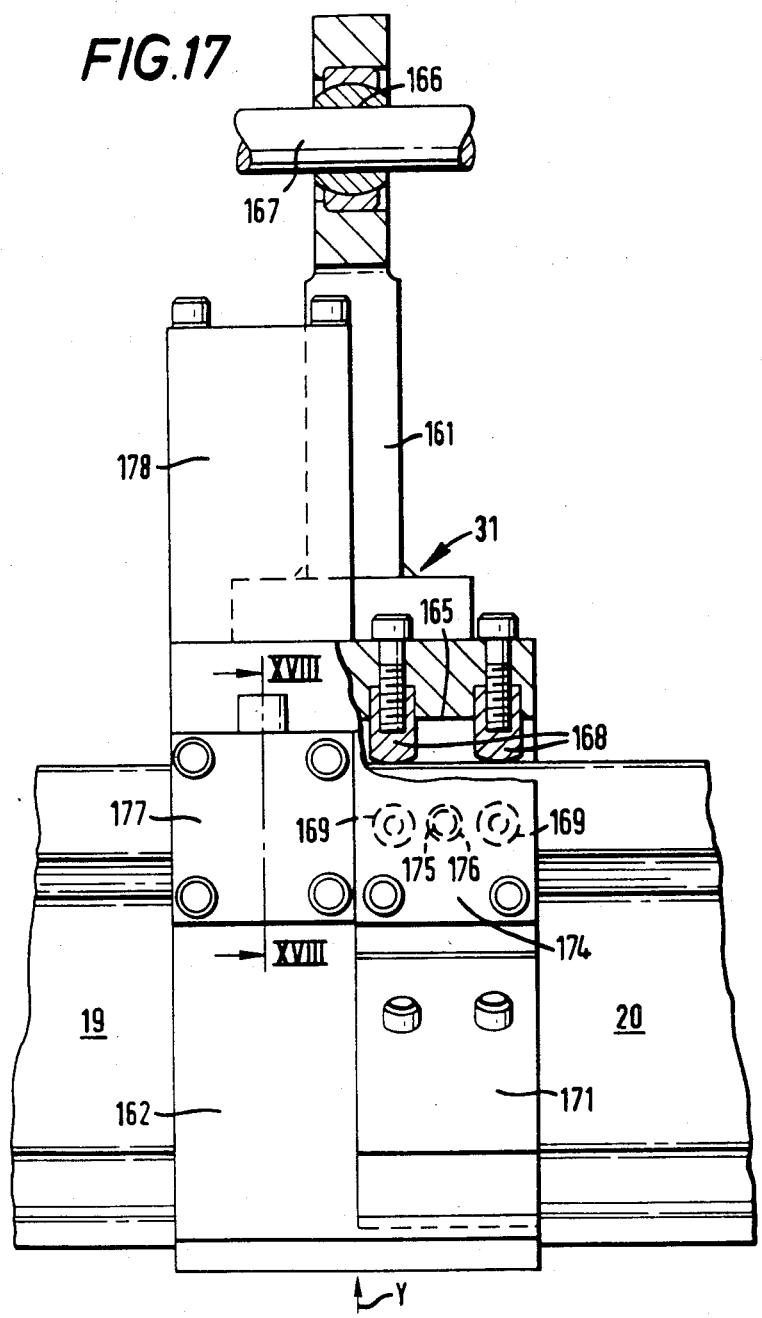
FIG. 17 is a partly-sectioned side elevation of FIG. 16.

FIGS. 16 and 17 show that the alignment device 31 comprises a suspension arch 161 which is secured at its feet to a flat top surface of a generally U-shaped main body 162 which has outwardly cranked arms 163 and 164. Hence the bight 165 formed by the main body 162 has an upper portion with a substantially rectangular cross-section and a lower, open bottomed portion which has a substantially trapezoidal cross-section. A hole 166, formed centrally in the cross piece of the suspension arch 161, receives a bar 167 of a suspension hook which is fitted to the bottom of the respective lazy tong assembly of the extensible support arrangement 34.

Six cylindrical anvils are fixed in the main body 162 between one end and the centre of that body 162. They project into the bight 165 and they are located within the main body 162 with precision so that their ends are precisely located abutments. Two of the anvils, which are referenced 168, project downwardly from the top wall of the main body 162 with their axes in the longitudinal plane of symmetry of the main body 162. Another pair of the anvils, referenced 169 project laterally into the bight 165 from locations in the cranked arm 163 above the elbow of cranked arm 163. The other two anvils 170 project laterally into the bight 165 from locations in the cranked arm 164 above the elbow of that cranked arm 164. The plane in which the axes of the laterally projecting anvils 169 and 170 lie is normal to the longitudinal plane of symmetry of the main body 162 and the axis of each of the anvils 169 and 170 lies in a respective transverse plane which passes through the axis of a respective one of the downwardly projecting anvils 168 and which is normal to the longitudinal plane of symmetry of the main body 162, each anvil 169 and a respective one of the anvils 170 being coaxial.

An hydraulic cylinder 171 is mounted by its body on the lower, outwardly sloping portion of each cranked arm 163, 164 with its plunger 172 projecting into the bight 165 through a respective aperture 173 in the respective cranked arm 163, 164. The plungers 172 project upwardly into the bight 165 with their axes oblique to the longitudinal plane of symmetry of the main body 162. Each of two other hydraulic cylinders 174 is mounted by its body on the outer surface of the upper portion of each cranked arm 163, 164 with its plunger 175 projecting through a respective aperture 176 in the upper portion of the respective cranked arm 163. The axes of the plungers 175 are in the same plane as the axes of the two laterally projecting anvils 170. The axes of the four plungers 172 and 175 all lie in a single transverse plane which is substantially midway between the transverse planes in which the axes of the anvils 168, 169 and 170 lie.

Two pneumatically-operable electromechanical transducer assemblies 177 which have their longitudinal axes in substantially the same plane as the axes of the laterally projecting anvils 169 and 170, and a third such transducer 178 which has its longitudinal axis in the longitudinal plane of symmetry of the main body 162, are mounted on the half of the main body 162 which does not carry the anvils 168, 169 and 170 and the hydraulic cylinders 171 and 174. One of the transducer assemblies 177 is mounted on the upper portion of the cranked arm 163 and the other one is mounted on the upper portion of the cranked arm 164. The transducer assemblies 177 and 178 are similar and FIG. 18 illustrates the construction of the transducer assembly 177 that is mounted on the cranked arm 164, by way of example.

Figure 18:
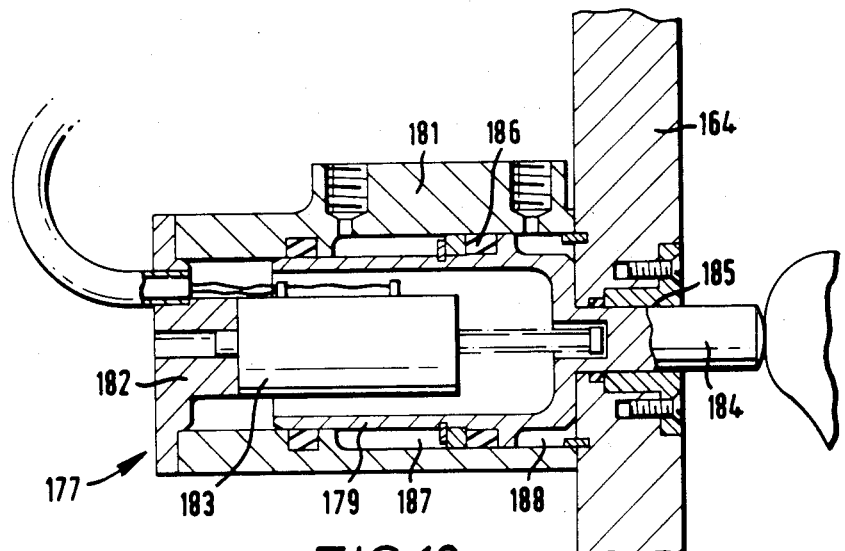
FIG. 18 is a section on the line XVIII—XVIII in FIG. 17.
Figure 19:
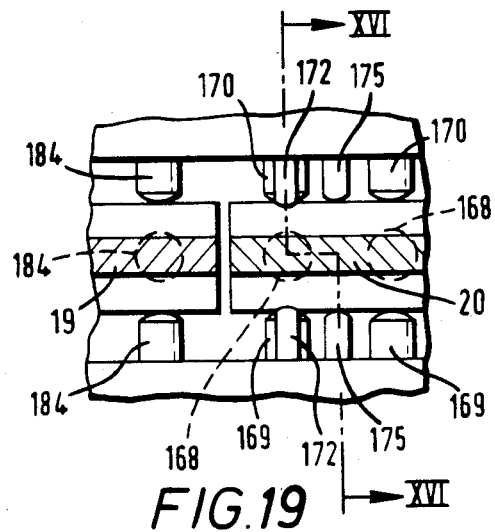
FIG. 19 is a fragmentary view as seen on Arrow Y in FIG. 17.

FIG. 18 shows that the transducer assembly 177 comprises a cup-shaped piston 179 slidably located in a stepped bore formed in a housing 181. The smaller diameter end of the stepped bore is closed by a plug 182 on which an electromechanical transducer 183 is mounted inside the housing 181. Leads from the terminals of the transducer 183 are led through the end plug 182 for connection into a control system of the machine 10.

The housing 181 is mounted on the outer surface of the upper portion of the cranked wall 164 at the larger diameter end of the stepped bore. A plunger 184, which is formed integrally with the cup-shaped piston 179, projects through an aperture 185 in the cranked wall 164 and is a sliding fit in that aperture 185. A piston ring 186 is fitted around the cup-shaped piston 179 and slides within the larger diameter portion of the stepped bore so as to divide the annular space surrounding the piston 179 into two chambers 187 and 188. The chambers 187 and 188 are connected into a pneumatic control system of the machine 10. The transducer 183 is operatively associated with the piston 179 so that the output signal from the transducer 183 is a measure of the location of the plunger 184 relative to the cranked arm 164. The axis of the plunger 184 lies in substantially the same plane as the axes of the laterally projecting anvils 169.

It follows that the output signal from the transducer 183 of the other transducer assembly 177 is a measure of the location of the plunger 184 of that other assembly 177 relative to the cranked arm 163 and that the output signal from the transducer 183 of the transducer assembly 178 is a measure of the location of the plunger 184 of the assembly 178 relative to the top of the main body 162.

The axis of the downwardly projecting plunger of the transducer assembly 178 lies in substantially the same plane as the axes of the downwardly projecting anvils 168.

An hydraulic cylinder (not shown) is mounted on the static head 12 with its axis substantially horizontal. It is located relative to the gap and has a sufficient stroke such that its cylinder rod is spaced from the gap when the hydraulic cylinder is contracted and such that it extends into the gap when extended.

The control system that controls the cylinders 171 and 174 and the transducer assemblies 177 and 178 of the alignment device 31, the electronic circuit that includes the leads of the transducers 183, and the electrical circuitry that includes the limit switches 118, 148, 149, 153 and 155 are incorporated in a main control system of the machine 10 which controls operation of the various hydraulic devices including the actuators 17, the clamping units 25 and 26, the means for driving the endless belts 50 and 55, and hence the trolley 28 and the carriages 52 and 53, the extensible support arrangements 33 and 34 and the various cylinders incorporated in the shear head 32. The main control system also includes various other limit switches which cooperate with respective movable parts of the machine to signal respective parts of a sequence of operation of the machine.

The work pieces 19 and 20 are positioned in the respective head 12, 13 of the machine 10 for welding together end to end. The work piece 19 may be a single length of rail but is more likely to be a length of railway track comprising a number of lengths of rail previously welded together end to end. It is supported by the support roller 21 and the support pad 23. The work piece 20 is a single length of rail.

The clamping units 25 and 26 are operated to clamp the work pieces 19 and 20 in position within the respective heads 12 and 13.

The trolley 28 is driven from a stowage location at one end of the gantry 29 in which both beams 35 and 36 are displaced laterally from the gap between the heads 12 and 13 to a location in which the beam 35 is vertically above that gap as shown in FIG. 1. The carriage 52 is driven from one end of the beam 35, namely the end that is secured to the end plate 37, to a location at the other end of the beam 35 at which the alignment device 31 is positioned vertically above the gap between the two heads 12 and 13, and thus above the ends of the two work pieces 19 and 20 in that gap, as shown in FIGS. 1 and 3. It will be noted from FIG. 3 that the carriage 53 remains at the end of its beam 36 adjacent the end plate 37. The extensible support arrangements 33 and 34 are both in their contracted conditions as shown in FIGS. 2 and 8 during such movement of the trolley 28 and the carriage 52. It will be understood that each extensible support arrangement 33, 34 is held in its contracted condition by the action of hydraulic fluid under pressure supplied to the respective valve block 92 through the respective articulated hydraulic feed pipe assembly 94.

The hydraulic fluid pressure maintaining the alignment device extensible support arrangement 34 contracted is relieved automatically by opening the appropriate return path to the reservoir tank through the connections 96, when the alignment device 31 is in position vertically above the adjacent ends of the work pieces 19 and 20. Consequently the weight of the alignment device 31 and the respective valve manifold 91 and valve block 92 causes extension of the respective lazy tong assembly 77 so that the alignment device 31 is lowered onto the work piece 20. The plungers 172 and 175 of the hydraulic cylinders 171 and 174, and the plungers 184 of the transducer assemblies 177 and 178 are in the retracted condition as the alignment device 31 is lowered. Lowering of the alignment device 31 is terminated by abutment of the downwardly projecting fixed anvils 168 with the top of the work piece 20.

The pair of laterally projecting anvils 169 or 170 that can abut the side of the rail head of the work piece 20 that will be the running surface of the rail are placed in abutment with that side of the rail head. The actuators 171 and the actuator 174 that is on the opposite side of the work piece 20 from the running surface are then operated to extend their plungers 172 and 175 so that the main body 162 is clamped to the work piece 20 which is located relative to the main body 162 by the anvils 168 and whichever of the anvils 169 and 170 that abut the running surface of the rail head. The piston 179 of the transducer assembly 178 and whichever one of the pistons 179 of the transducer assemblies 177 that can abut the side of the rail head of the work piece 19 that is to be the running surface, are driven by pneumatic pressure to engage the respective plungers 184 with the top and the running surface of the work piece 19 respectively. The output signals from the transducers 183 are computed and converted into drive signals to effect automatic adjustment of the static head 12 by operation of its vertically acting hydraulic cylinder 14 and the power driven wedge arrangement 15 to adjust the vertical position of the static head 12 relative to the movable head 13 and the base 11 and/or to operate similar devices which adjust the position of the static head 12 laterally relative to the movable head 13 and the base 11. Hence the work piece 19 is automatically brought into alignment with the work piece 20 by appropriate automatic adjustment of the position of the static head 12.

The hydraulic cylinders 171 and 174 and the transducer assemblies 177 and 178 are operated to retract the respective plungers 172, 175 and 184 when alignment of the work pieces 19 and 20 has been established. The connections of the respective hydraulic feed pipe assembly 94 are switched so that hydraulic fluid under pressure is supplied through the connection 95 of the carriage 52 and the respective pipe assembly 94 to the valve manifold 91 and valve block 9 to effect raising of the alignment device 31 by contraction of the respective lazy tong assembly 77.

The carriage 52 is driven to the end of the beam 35 adjacent the end plate 37 once the alignment device extensible support 34 has been contracted, and the trolley 28 is driven to the end of its travel on the gantry 29 so that it, the alignment device 31 and the shear head 32 are positioned in the stowage location which is displaced from the weld location both sideways and in a direction parallel to the work pieces 19 and 20. The alignment device 31 and the shear head 32 are shielded from the weld location by a suitably located flash guard (not shown).

The butt-welding machine 10 is operated in the usual manner to effect a butt-welded joint between the work pieces 19 and 20.

The clamping unit 26 of the movable head 13 is released to an intermediate parking position, as shown in FIG. 1, as soon as the work pieces 19 and 20 have been welded together. The static head 12 is raised by operation of the vertically acting hyraulic cylinder 14 which is extended to the end of its stroke. The welded railway track comprising the welded work pieces 19 and 20 is thus raised a small distance so that it is clear of the dies 26A and 26B of the clamping unit 26 because it remains clamped by the clamping unit 25 and the static head 12. We have found that this can be done without distorting the weld, even though it is hot and soft, because the work piece 20 remains supported by the support means near to the weld and by the resiliently loaded support roller 22.

The movable head 13 is then moved away from the static head 12 back to the position it adopted before the welding operation, which is shown in FIGS. 1 and 3. At the same time, the trolley 28 and the carriage 53 are driven to locate the shear head 32 vertically above the weld. The hydraulically operable extensible support arrangement 33 is then operated by remote control, in substantially the same way as has been described for the alignment unit extensible support arrangement 34, to lower the shear head 32. As the shear head 32 is lowered, the latch 107 is held in its released position, as shown chain-dotted in FIG. 13, by the hydraulic cylinder 105 which is contracted, and the arm 106 is held in the position in which it depends vertically from its pivot mounting, which is indicated in chain-dotted lines in FIG. 13, by the hydraulic cylinder 104 which also is contracted. The side tools 123 and 124 are spaced from the back plate projections with which they cooperate; this position for the side tool 123 and the side tool carrier assembly 128 is shown chain-dotted in FIG. 15. This condition is effected by actuation of the hydraulic cylinder 138 which is extended. The top tool 109, is in its lowermost position relative to the back plate 101, resting upon the abutment provided which may be the projections with which the side tool carrier assemblies 128 and 129 cooperate, namely the projection 125 shown in FIG. 15. The positions of the arm 106, the latch 107, the top tool 109 and the side tools 123 and 124 are sensed by the respective limit switches 153, 155, 118, 148 and 149. The appropriate hydraulic fluid pressure supply to effect contraction of the hydraulic cylinders 104 and 105 and extension of the hydraulic cylinder 138 is provided via the respective articulated feed pipe assembly 94, valve manifold 91 and valve block 92.

Lowering of the shear head 32 continues until shortly after the top tool 109 contacts the top of the part of the welded railway track that is formed by the work piece 20. The top tool 109 is held stationary by abutment with the welded track during the final part of downwards movement of the remainder of the shear head 32. The consequent movement of the back plate 101 relative to the top tool 109 effects a change of state of the limit switch 118 which in turn reverses the hydraulic fluid pressure connections to the cylinder 104.

Reversal of the hydraulic fluid pressure supply to the cylinder 104 causes extension of that cylinder 104 which in turn effects swinging movement of the arm 106 in a clockwise direction as seen in FIG. 13 to bring that arm 106 into contact with the opposite end of the horseshoe-shaped back plate 101 so that it bridges the mouth of the bight 112 and places the cutting edge 152 of the tool 151 in contact with the bottom of the workpiece 20. The state of the limit switch 153 is changed at the completion of that movement of the arm 106 because the plunger of that switch 153 is moved into engagement with the flat 154. The change of state of the limit switch 153 effects a changeover of the hydraulic fluid pressure connections to the cylinder 105 so as to cause extension of that cylinder 105 which swings the latch 107 into position to latch the arm 106 in the position in which it places the cutting edge 152 of the tool 151 in contact with the bottom of the workpiece 20. Such movement of the latch 107 into its latching position, which is shown in full lines in FIG. 13, is sensed by the limit switch 153, the plunger of which is moved into engagement with the flat 156. The consequent change in state of the limit switch 155 effects a changeover of the hydraulic fluid pressure connections to the cylinder 138.

Reversal of the hydraulic fluid pressure supply to the cylinder 138 causes contraction of the cylinder 138 which, due to the combined action of the stud 135 in the arcuate slot 134, the pin 146 in the arcuate slot 141, and the stub shaft 144 in the sleeve bearing 143, causes angular movement of the side tool carriage assemblies 128 and 129 towards the cooperating projections formed on the back plate 101 so as to hook each side tool carrier assembly part, such as the part 131, onto the corresponding projection, say the projection 125. That completes assembly of the shear head 32 around the portion of the welded track that comprises the work piece 20.

At the same time the carriage 53 is locked to the movable head 13.

The movable head 13 is then driven towards the static head 12 by the butt cylinders 17. The top tool 109 is urged against the railway track by the hydraulic ram 116. The shear head 32 is urged towards the static head 12 in front of the movable head 13 so that the cutting edges 111, 126, 127 and 152 closely follow the respective profiled surface of the welded railway track and then shear the weld upset from the welded joint between the work pieces 19 and 20. Weld upset is removed by the side tools 123 and 124 first and then by the top and bottom tools 109 and 151. Hence four separate pieces of swarf are produced.

The roller 147 runs on the top of the railway track, behind the top tool 109, and inhibits digging in of the top tool 109. The stripping forces that act upon the side tools 123 and 124 cause a 'hooking' on action of the side tool carrier assembly parts, such as the part 131, onto the cooperating projections from the back plate 101, such as the projection 125. As a result of this 'hooking' on action, the inner face of the respective projection, which is oblique to the axis 108 of symmetry, reacts the outwardly directed component of force due to the stripping or shearing action of each of the tools 123 and 124, and the outer face, namely the surface of the projection that is parallel to the back of the back plate 101, react the longitudinal stripping forces.

The hydraulic connections to the cylinder 138 are changed again on completion of the cutting stroke, which is signalled by a respective limit switch, so that the cylinder 138 extends and effects swinging movement of the side tool carrier assemblies 128 and 129 from the 'hooked on' engagement with the respective projections from the back plate 101 to the displaced location, such as the location shown chain-dotted in FIG. 15. Hence the cutting edges 126 and 127 are spaced from the corresponding surface portions of the railway track. Also the load applied to the top tool 109 by the hydraulic ram 116 is relieved.

The movable head 13 of the machine is moved away from the static head 12 by retraction of the butt cylinders 17. The hydraulic cylinder that is mounted on the static head 12 with its axis horizontal is extended so that its cylinder rod projects into the gap, engages the shear head 32 and ensures that the shear head 32 follows movement of the movable head 13 away from the static head 12. Such movement is permitted by the top and bottom tools 109 and 151 because the load that urged the top tool 109 against the top of the railway track has been relieved.

The hydraulic fluid connections to the hydraulic cylinder 105 are changed when the movement of the movable head 13 away from the static head 12 is completed, which is signalled by a respective limit switch. Such reversal of the hydraulic fluid connections to the hydraulic cylinder 105 causes contraction of that cylinder 105 to swing the latch 107 to its position shown chain-dotted in FIG. 13 in which the arm 106 is released. The consequent pivotal movement of the latch 107 deflects the plunger of the limit switch 155 which effects a changeover of the hydraulic connections to the hydraulic cylinder 104 so that that cylinder 104 is contracted as well. Contraction of the hydraulic cylinder 104 swings the arm 106 from the position shown in FIG. 13 in which it bridges the mouth of the bight 112 to the position shown chain-dotted in FIG. 13 in which the arm 106 depends vertically from its pivot mounting to the base plate 101. Completion of this swinging movement effects deflection of the plunger of the limit switch 153 which in turn initiates a changeover in the fluid pressure connections to the respective extensible fluid support arrangement 33 with a result that the respective lazy tong assembly 77 is contracted and the shear head raised.

The carriage 53 is released from the movable head 13 and is driven to the other end of the respective beam 36, adjacent the end plate 37. The trolley 28 is then driven to the position in which the shear head 32 is displaced laterally from the gap between the static and movable heads 12 and 13.

Simultaneously the clamping units 25 and 26 are both fully released and the vertically acting hydraulic cylinder 14 is caused to contract so that the static head 12 is lowered. The length of welded railway track can then be transferred in the direction from the movable head 13 towards the static head 12 and repositioned in the static head 12 for welding to a further length of rail. The hydraulic cylinder mounted on the static head is contracted to withdraw its cylinder rod from the gap between the static and movable heads 12 and 13.

The automatic alignment system, including the alignment device 31 that is incorporated in the machine 10, is calibrated before being used to align a pair of work pieces which are mounted in the heads 12 and 13 of the machine 10 for welding together end to end. The calibration procedure comprises clamping a true bar against the two pairs of four stops formed by the two downwardly projecting anvils 168 and the pair of laterally projecting anvils 169 or 170 which are to be used, depending upon on which side of the rail the running surfaces are formed, operating the cylinders 171 and the cylinder 174 that is opposite the selected pair of laterally projecting anvils 169, 170 to clamp the true bar against the appropriate anvils 168 and 169 or 170, and setting the controls of the system to a selected datum such as zero. Once calibrated the system is operable to sense displacement from the datum of the work piece to which the alignment device main body 162 is not clamped and to signal adjustment sensed.

Figure 20:
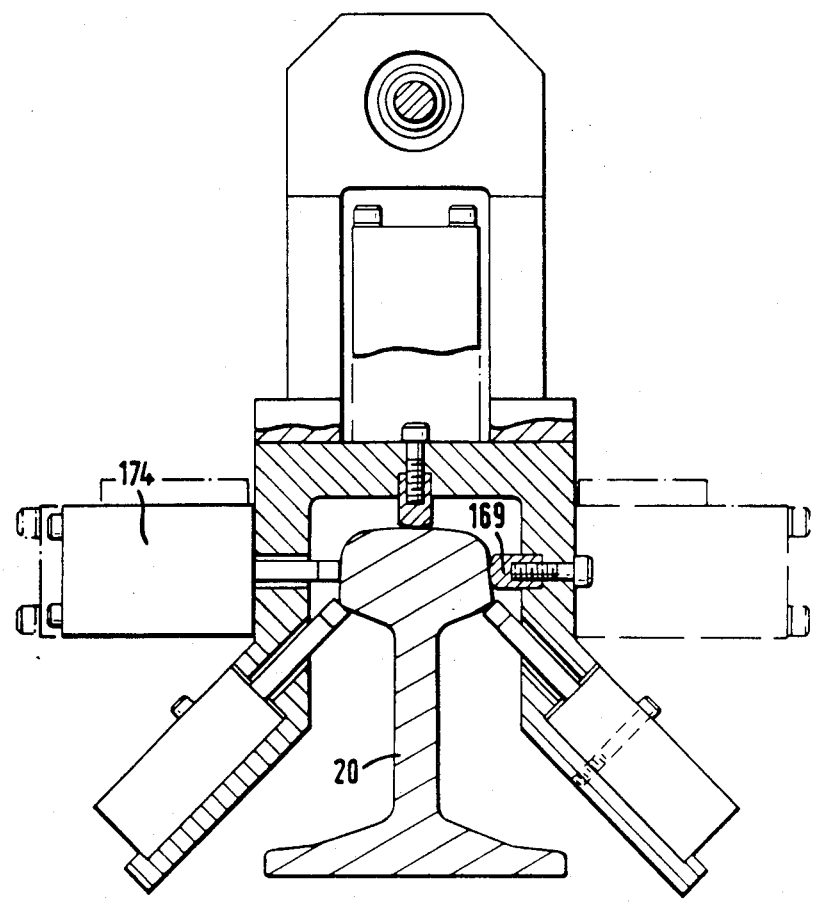
FIG. 20 is a view similar to FIG. 16 illustrating a modification.

FIG. 20 shows that the alignment device may be provided with only one pair of laterally projecting anvils 169 and only one laterally projecting pneumatic cylinder 174 which is opposite the pair of laterally projecting anvils 169. The device shown in FIG. 20 can be used to align running surfaces regardless of which side of the work pieces those surfaces are, providing the pair of anvils 169 are brought into engagement with that side of the work piece 20. It may be necessary to rotate the alignment device 31 through 180° to enable the anvils 169 to be brought into contact with the intended running surface on the work piece 20.

We have found the lazy tong assembly 77 described above attractive for raising and lowering the alignment device 31 and the shear head 32, the relative lack of rigidity of that arrangement proving to be an asset in this application.

An alternative form of mechanical handling equipment may comprise an arm of a robot mechanism.

Simple precisely-located projections may be used instead of the separable anvils 168, 169 and 170 described and illustrated.

We claim:

1. A method of removing weld upset from butt-welded rail before the rail is moved from a butt-welding machine in which a weld is formed, wherein after the weld is formed, a group of linked shear cutting tools is inserted into a gap between heads of the machine in a direction transverse to the butt-welded rail and is automatically assembled around the rail between the weld and a movable head of the machine to form a continuous frame therearound with a cutting edge of each tool located adjacent a correspondingly-contoured surface portion thereof, the group including one tool which has a straight cutting edge which is located adjacent a flat bottom surface of the rail, the straight cutting edge being long enough to extend across the full width of the flat bottom surface of the rail, whereafter the movable head is moved towards the weld so that the resultant continuous frame is moved across the weld upset which is sheared from the butt-welded rail by the cutting tools, weld upset being removed from the flat bottom surface in one piece by said one tool.

2. A method according to claim 1, wherein automatically-operable mechanical handling equipment is used to insert the group of linked tools into said gap, to present at least one of the tools to the butt-welded material to initiate and effect automatic assembly of the tools around the butt-welded material, to disassemble the tools from around the butt-welded material after weld upset has been removed by the tools, and to transfer the tools from within said gap to said storage location remote therefrom where the tools are shielded from weld spatter during welding.

3. A method according to claim 2, wherein the mechanical handling equipment is also used to insert alignment means into said gap before the weld is formed, said alignment means being operated automatically to check alignment of two work pieces in bar form that are mounted in the machine for welding together end to end by butt-welding by operation of the machine, the alignment means being removed from said gap by said mechanical handling equipment when alignment of the work pieces has been established, but before the weld is formed, and being transferred to a respective storage location remote from said gap wherein said alignment means are shielded from weld spatter during welding.

4. A method according to claim 1, wherein the group of tools are linked by virtue of some of them being mounted on a horseshoe-shaped member and by virtue of the remaining one or more of the tools being mounted on an arm which is pivoted to the horseshoe-shaped member adjacent one of its ends, means being provided for swinging the arm relative to the horseshoe-shaped member and latching means being provided for latching the arm to the other end of the horseshoe-shaped member, automatic assembly of the continuous frame around the butt-welded material being initiated by abutment of one of the tools on the horseshoe-shaped member with the correspondingly-contoured portion of the butt-welded material, being effected by operation of said means which swing the arm relative to the horseshoe-shaped member, and being completed by latching the arm to the other end of the horseshoe-shaped member by automatic operation of the latching means.

5. A method according to claim 4, wherein said one tool is mounted on the horseshoe-shaped member in a manner which constrains that tool against unrestricted movement relative to the horseshoe-shaped member but which allows and guides it for rectilinear sliding movement to and fro relative to the correspondingly-contoured surface of the butt-welded material with which it cooperates.

6. A method according to claim 5, wherein said one tool is urged against said corresponding-contoured surface.

7. A method according to claim 5, wherein said one tool is so retained between two other tools which are pivotally-mounted for angular movement relative to the horseshoe-shaped member, each about an axis which is substantially parallel to the direction of rectilinear movement of said one tool relative to the horseshoe-shaped member.

8. A method according to claim 7, wherein said two other tools are moved pivotally after upset has been removed by the tools so that the cutting edges of said two other tools are moved away from the correspondingly-contoured surfaces of said butt-welded material.

9. A method according to claim 1 wherein the group of linked cutting tools is assembled into the continuous frame around the butt-welded material so that the cutting edge of at least one of the tools is not in the same plane transverse to the butt-welded material as the cutting edge of at least one other of the cutting tools so that said one tool and said one other tool produce separate pieces of swarf.

10. Apparatus for removing weld upset from butt-welded rail before the rail is removed from a butt-welding machine which typically comprises two spaced heads which are adapted to clamp a pair of rail lengths whilst they are being welded together end to end to form said butt-welded rail, the welded joint between the two rail lengths being formed in the gap between the heads, the apparatus comprising a group of linked cutting tools which are adapted to be assembled around the butt-welded rail between a movable one of the heads and the welded joint so as to form a continuous frame around the butt-welded rail, the cutting tools being arranged so that each of their cutting edges is located adjacent a correspondingly-contoured surface portion of the butt-welded rail when the group of tools is assembled around said butt-welded rail to form said continuous frame, the group of linked cutting tools including one tool which has a straight cutting edge which is located adjacent a flat bottom surface of the rail when the group of tools is assembled around said butt-welded rail to form said continuous frame, the straight cutting edge being long enough to extend across the full width of the flat bottom surface of the rail, so that weld upset is removed from the flat bottom surface of the welded rail in one piece by said one tool, and mechanical handling equipment operable automatically to insert the tools into said gap in a direction transverse to the butt-welded rail, to present at least one of the tools to the butt-welded rail and thereafter to assemble the tools around the butt-welded rail to form said frame, to disassemble the tools from around the butt-welded rail after weld upset has been removed and to transfer said tools from within said gap to a location remote therefrom where the tools are shielded from weld spatter.

11. Apparatus according to claim 10, including alignment means which are automatically operable to check alignment of two work pieces which are clamped in the heads of a butt-welding machine for welding together end to end, said mechanical handling equipment also being operable to insert said alignment means into said gap to enable alignment of the two work pieces to be checked before the weld is formed, to remove said alignment means from said gap when alignment of the work pieces is established, and to transfer the alignment means to a respective storage location remote from said gap wherein the alignment means are shielded from weld spatter.

12. Apparatus according to claim 10, wherein the group of tools are linked by virtue of some of them being mounted on a horseshoe-shaped member and by virtue of the remaining one or more of the tools being mounted on an arm which is pivoted to the horseshoe-shaped member adjacent one of its ends, there being latching means provided for latching the arm to the other end of the horseshoe-shaped member, and power means operable to swing the arm relative to the horseshoe-shaped member, automatic assembly of the continuous frame around the butt-welded material being initiated by abutment of one of the tools on the horseshoe-shaped member with the correspondingly-contoured portion of the butt-welded material, and being effected by operation of said power means to swing the arm relative to said horseshoe-shaped member and being completed by latching the arm to the other end of the horseshoe-shaped member by operation of said latching means.

13. Apparatus according to claim 12, wherein said one tool is mounted on the horseshoe-shaped member, substantially midway between the ends thereof, in a manner which constrains the tool against unrestricted movement relative to the horseshoe-shaped member but which allows and guides it for rectilinear sliding movement to and fro relative to the correspondingly-contoured surface with which it cooperates.

14. Apparatus according to claim 13, wherein means operable to urge said one tool against said correspondingly-contoured surface are provided.

15. Apparatus according to claim 13, wherein said one tool is so retained between two other tools which are pivotally mounted for angular movement relative to the horseshoe-shaped member, each about an axis which is substantially parallel to the direction of rectilinear movement of said one tool relative to the horseshoe-shaped member.

16. Apparatus according to claim 15, wherein each of said two other tools has a surface which cooperates with a complementary surface of the horseshoe-shaped member whereby to make face to face contact with that complementary surface during upset removal, said cooperating surfaces of the horseshoe-shaped member and each of said two other tools being so profiled that the horseshoe-shaped member reacts forces applied to it during upset removal in two, mutually-perpendicular directions through each of said two other tools.

17. Apparatus according to claim 15, wherein means for effecting pivotal movement of said two other tools so that cutting edges thereof are moved away from the correspondingly-contoured surface of said butt-welded material are provided, such means being caused to effect such movement after the upset has been removed.

18. Apparatus according to claim 17, wherein the means for effecting pivotal movement of said two other tools comprise a powered telescopic actuator which has one of its relatively movable parts pivotally connected to one of said two other tools and another of its relatively movable parts pivotally connected to an intermediate member which is journalled in the other of said two other tools, and guide means with which said one of said two other tools and said intermediate member cooperate so that they are constrained for arcuate movement relative to said horseshoe-shaped member with extension and contraction of said telescopic actuator which extends generally in a direction which is transverse to the axes of perpendicular movement of said two other tools.

19. Apparatus according to claim 10, wherein the group of linked cutting tools is arranged so that the cutting edge of at least one of the tools is not in the same plane transverse to the butt-welded material as the cutting edge of at least one other of the tools so that said one tool and said one other tool produce separate pieces of swarf.

20. A method of aligning two work pieces in bar form and of constant cross section which are mounted in a butt-welding machine for welding together end to end by butt-welding by operation of the machine, comprising inserting alignment means into a gap between heads of the machine, locating said alignment means alongside the adjacent ends of the work pieces which are in said gap, automatically sensing displacement of a predetermined respective surface portion of one of the work pieces from a predetermined location relative to said alignment means, effecting automatic operation of adjustment means in response to such displacement being sensed, said adjustment means being operable to adjust the mounting of one of the work pieces, whereby to shift said predetermined respective surface portion to said predetermined location at which the work pieces are aligned, wherein, when the alignment means are located alongside the adjacent ends of the work pieces, they are clamped to the other work piece on which said predetermined respective surface portion is not formed, thereby establishing a predetermined fixed spatial relationship between said end of the other work piece and said alignment means before automatic operation of said adjustment means is effected to shift said predetermined respective surface portion to said predetermined location.

21. A method according to claim 20, wherein automatically-operable mechanical handling equipment is used to insert the alignment means into the gap and to remove the alignment means from the gap when alignment of the work pieces has been established, but before the weld is formed, and to transfer the alignment means to a respective location remote from the gap wherein the alignment means are shielded from weld spatter during welding.

22. A method according to claim 21, wherein the alignment means are inserted into and removed from the gap by a lazy tong assembly which is incorporated in the mechanical handling equipment, the lazy tong assembly depending from a trolley which runs on a trackway above the butt-welding machine, the alignment means being transferred to the respective storage location remote from the gap by translational movement of the trolley on its trackway away from the gap when the lazy tong assembly is retracted.

23. A method according to claim 20, wherein the alignment means are located alongside the adjacent ends of the work pieces by the step of bringing precision locating stop means carried by structure of the alignment means into contact with a predetermined respective surface portion of said other work piece.

24. A method according to claim 23, wherein the alignment means are clamped to the other work piece by automatically-operating remotely controllable clamping means carried by the alignment means to clamp the work piece against said locating stop means.

25. A method according to claim 20, wherein displacement of said predetermined respective surface portion from its predetermined location relative to said alignment means is sensed by automatic operation of pneumatically-operable electromechanical transducer means comprising a sensing plunger which is engaged with said predetermined respective surface portion by pneumatic pressure, the location of the plunger being measured by electromechanical means incorporated in the transducer means which emit an output which is a measure of the location of the plunger relative to structure of the alignment means which is clamped to the other work piece.

26. Apparatus for aligning two work pieces in bar form and of constant cross-section which are mounted in a butt-welding machine for welding together end to end by butt-welding by operation of the machine, the butt-welding machine comprising a spaced pair of heads; each head being adapted to clamp a respective one of the pair of work pieces whilst they are being welded together end to end, the apparatus comprising alignment means including structure which forms a bight which receives the adjacent ends of the work pieces when the alignment means are inserted into the gap between the heads of the machine and are located alongside the adjacent ends of the work pieces to align them, means carried by said structure and projecting into the bight at selected locations and forming precision locating stops for a work piece, automatically operable clamping means carried by said structure and adapted to clamp that work piece against said precision locating stops when operated whereby to precisely locate said structure and that work piece one relative to the other, and proximity sensing means carried by said structure and adapted to coact with a predetermined respective surface portion of the other of said work pieces whereby to sense displacement of that surface portion from a predetermined location relative to said structure, said sensing means being associated with adjustment means incorporated in one of said heads whereby to effect automatic operation of said adjustment means in response to such displacement being sensed such that said adjustment means operate to adjust the mounting of the respective work piece whereby to shift the predetermined respective surface portion of said other work piece to said predetermined location at which that work piece is aligned with the work piece clamped against said precision locating stops.

27. Apparatus according to claim 26, including mechanical handling equipment operable to insert the alignment means into said gap in a direction transverse to the work pieces until the work pieces are received within the bight and the precision locating stops contact the respective surface portions of the appropriate work piece, and to remove said alignment means from said gap when alignment of the work pieces is established, and to transfer the alignment means to a respective storage location remote from said gap wherein the alignment means are shielded from weld spatter.

28. Apparatus according to claim 27, wherein the mechanical handling equipment comprises a trolley which runs on trackway supported above the butt-welding machine and extending over the gap, and a lazy tong assembly which depends from the trolley and supports the alignment means structure, the alignment means being inserted into the gap and withdrawn from the gap by extension and contraction of the lazy tong assembly when the trolley is positioned above the gap, and the alignment means being transferred from the gap to a respective storage location remote from said gap by translational movement of the trolley on said trackway when the lazy tong assembly is contracted.

29. Alignment means according to claim 26, wherein said sensing means carried by said structure comprise pneumatically-operable electromechanical transducers including sensing plungers adapted to engage corresponding surface portions of said other of the work pieces and electromechanical means responsive to the relative location of each sensing plunger to structure of said transducer and to emit a related output signal operable to effect operation of said adjustment means whereby to shift the respective work pieces to a predetermined location relative to said structure of the alignment means.

30. A method of removing weld upset from butt-welded material in bar form and of constant cross-section, before that butt-welded material is removed from a butt-welding machine in which the weld from which weld upset is to be removed is formed, wherein, after the weld is formed, a group of linked shear cutting tools is translated from a storage location to a region of the machine which surrounds the weld, the storage location being sufficiently remote from said region that, when stored there, as it was during welding, the group of shear cutting tools was shielded from weld spatter which is generated during welding and which adheres to anything in said region, the group then being inserted into a gap between heads of the machine in a direction transverse to the butt-welded material and being assembled around the butt-welded material, between the weld and a movable head of the machine, to form a continuous frame therearound with a cutting edge of each tool located adjacent a correspondingly contoured surface portion thereof, whereafter the movable head is moved towards the weld so the resultant continuous frame is moved across the weld upset which is sheared from the butt-welded material by the cutting tools.

31. A method according to claim 30, wherein automatically operable mechanical handling equipment is used to translate the group of tools from said storage location to said region, to insert the group of tools into said gap, to present at least one of the tools to the butt-welded material to initiate and effect automatic assembly of the tools around the butt-welded material, to disassemble the tools from around the butt-welded material after weld upset has been removed by the tools, and to return the tools from within said gap to said storage location.

32. A method according to claim 30, wherein the mechanical handling equipment is also used to insert alignment means into said gap before the weld is formed, said alignment means being operated automatically to check alignment of two work pieces in bar form that are mounted in the machine for welding together end to end by butt-welding by operation of the machine, the alignment means being removed from said gap by said mechanical handling equipment when alignment of the work pieces has been established, but before the weld is formed, and being translated to a respective storage location remote from said gap wherein said alignment means are shielded from weld spatter during welding.

33. Apparatus for removing weld upset from butt-welded material in bar form and of constant cross-section before that material is removed from a butt-welding machine which typically comprises two spaced heads which are adapted to clamp a pair of work pieces whilst they are being welded together end to end to form said butt-welded material, the welded joint between the two work pieces being formed in the gap between the heads, the apparatus comprising a group of linked cutting tools which are adapted to be assembled around the butt-welded material between a movable one of the heads and the welded joint so as to form a continuous frame around the butt-welded material, the cutting tools being arranged so that each of their cutting edges is located adjacent a correspondingly contoured surface portion of the butt-welded material when the group of tools is assembled around said butt-welded material to form said continuous frame, and mechanical handling equipment operable to translate the group of tools from a storage location to a region of the machine which surrounds the welded joint, the storage location being sufficiently remote from said region that, when stored there, the tools are shielded from weld spatter which is generated during welding and which adheres to anything in said region, the mechanical handling equipment also being operable to insert the tools into said gap in a direction transverse to the butt-welded material, to present at least one of the tools to the butt-welded material and thereafter to assemble the tools around the butt-welded material to form said frame, to disassemble the tools from around the butt-welded material after weld upset has been removed, to remove said tools from within said gap and to translate said tools to said storage location.

34. Apparatus according to claim 33, including alignment means which are automatically operable to check alignment of two work pieces which are clamped in the heads of a butt-welding machine for welding together end to end, said mechanical handling equipment also being operable to insert said alignment means into said gap to enable alignment of the two work pieces to be checked before the weld is formed, to remove said alignment means from said gap when alignment of the work pieces is established, and to translate the alignment means to a respective storage location remote from said gap wherein the alignment means are shielded from weld spatter.

* * * * *